US012568507B2

(12) United States Patent
Zhu et al.

(10) Patent No.: US 12,568,507 B2
(45) Date of Patent: Mar. 3, 2026

(54) METHOD AND APPARATUS FOR DCI BASED DYNAMIC BEAM INDICATION

(71) Applicant: Samsung Electronics Co., Ltd., Suwon-si (KR)

(72) Inventors: Dalin Zhu, Allen, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 18/180,761

(22) Filed: Mar. 8, 2023

(65) Prior Publication Data

US 2023/0309112 A1    Sep. 28, 2023

Related U.S. Application Data

(60) Provisional application No. 63/447,810, filed on Feb. 23, 2023, provisional application No. 63/424,734, (Continued)

(51) Int. Cl.
*H04W 72/231* (2023.01)
*H04W 72/1273* (2023.01)

(52) U.S. Cl.
CPC ..... *H04W 72/231* (2023.01); *H04W 72/1273* (2013.01)

(58) Field of Classification Search
CPC ........... H04W 72/231; H04W 72/1273; H04W 72/232; H04B 7/024; H04B 7/0695; (Continued)

(56) References Cited

U.S. PATENT DOCUMENTS

2021/0028843 A1    1/2021  Zhou et al.
2021/0051635 A1    2/2021  Lo et al.
(Continued)

FOREIGN PATENT DOCUMENTS

WO    WO-2020063334 A1 *  4/2020  .......... H04L 5/0053
WO       2020215108 A2    10/2020
(Continued)

OTHER PUBLICATIONS

International Search Report and Written Opinion issued Jun. 20, 2023 regarding International Application No. PCT/KR2023/003883, 6 pages.

(Continued)

*Primary Examiner* — Sudesh M. Patidar

(57) ABSTRACT

Methods and apparatuses for downlink control information (DCI) based dynamic beam indication in a wireless communication system. A method performed by a user equipment (UE) includes receiving, in a first DCI, a set of transmission configuration indication (TCI) states including two TCI states; receiving a higher layer radio resource control (RRC) signaling including a parameter indicating whether or not a TCI state selection indicator is present in a second DCI that schedules a physical downlink shared channel (PDSCH); and receiving the second DCI. The method further includes determining, based on the parameter, whether the TCI state selection indicator is present in the second DCI; identifying, based on a presence or absence of the TCI state selection indicator, at least one TCI state from the set of TCI states to be used in reception of the PDSCH; and receiving, based on the identified at least one TCI state, the PDSCH.

17 Claims, 10 Drawing Sheets

Related U.S. Application Data filed on Nov. 11, 2022, provisional application No. 63/404,050, filed on Sep. 6, 2022, provisional application No. 63/340,376, filed on May 10, 2022, provisional application No. 63/326,018, filed on Mar. 31, 2022, provisional application No. 63/322,860, filed on Mar. 23, 2022.

(58) Field of Classification Search
CPC ..... H04B 7/088; H04L 5/0048; H04L 5/0051; H04L 5/0053; H04L 5/0055; H04L 5/0057; H04L 5/0094
See application file for complete search history.

(56) References Cited

U.S. PATENT DOCUMENTS

| | | | |
|---|---|---|---|
| 2021/0112560 A1 | 4/2021 | Khoshnevisan et al. | |
| 2021/0337525 A1 | 10/2021 | Rahman et al. | |
| 2021/0385832 A1* | 12/2021 | Zhang | H04B 7/0695 |
| 2022/0070899 A1 | 3/2022 | Huang | |
| 2023/0239852 A1* | 7/2023 | Oteri | H04W 72/23 370/329 |
| 2024/0187199 A1* | 6/2024 | Gao | H04L 5/0094 |
| 2024/0314767 A1* | 9/2024 | Zhang | H04W 72/1263 |

FOREIGN PATENT DOCUMENTS

| | | | | |
|---|---|---|---|---|
| WO | WO-2020220330 A1 | * | 11/2020 | |
| WO | WO-2021035423 A1 | * | 3/2021 | H04W 72/51 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued May 2, 2025 regarding Application No. 23775334.8, 14 pages.
Samsung, "On unified TCI framework for multi-TRP (MTRP) operation", 3GPP TSG RAN WG1 #112, R1-2301245, Feb. 2023, 12 pages.
Intel Corporation, "On Unified TCI Framework for multi-TRP", 3GPP TSG RAN WG1 #112, RI-2300932, Feb. 2023, 10 pages.

* cited by examiner

600

650

1300

1302

A UE receives a higher layer RRC signaling/parameter to indicate whether or not the second indicator for PDSCH reception(s) is present (or absent) in the corresponding scheduling DCI

1304

The second indicator is (RRC configured to be) present in the corresponding scheduling DCI ?

No

1308

The maximum number of MAC CE activated TCI codepoints is M2 = 16

Yes

1306

The maximum number of MAC CE activated TCI codepoints is M1 = 8

FIG. 13

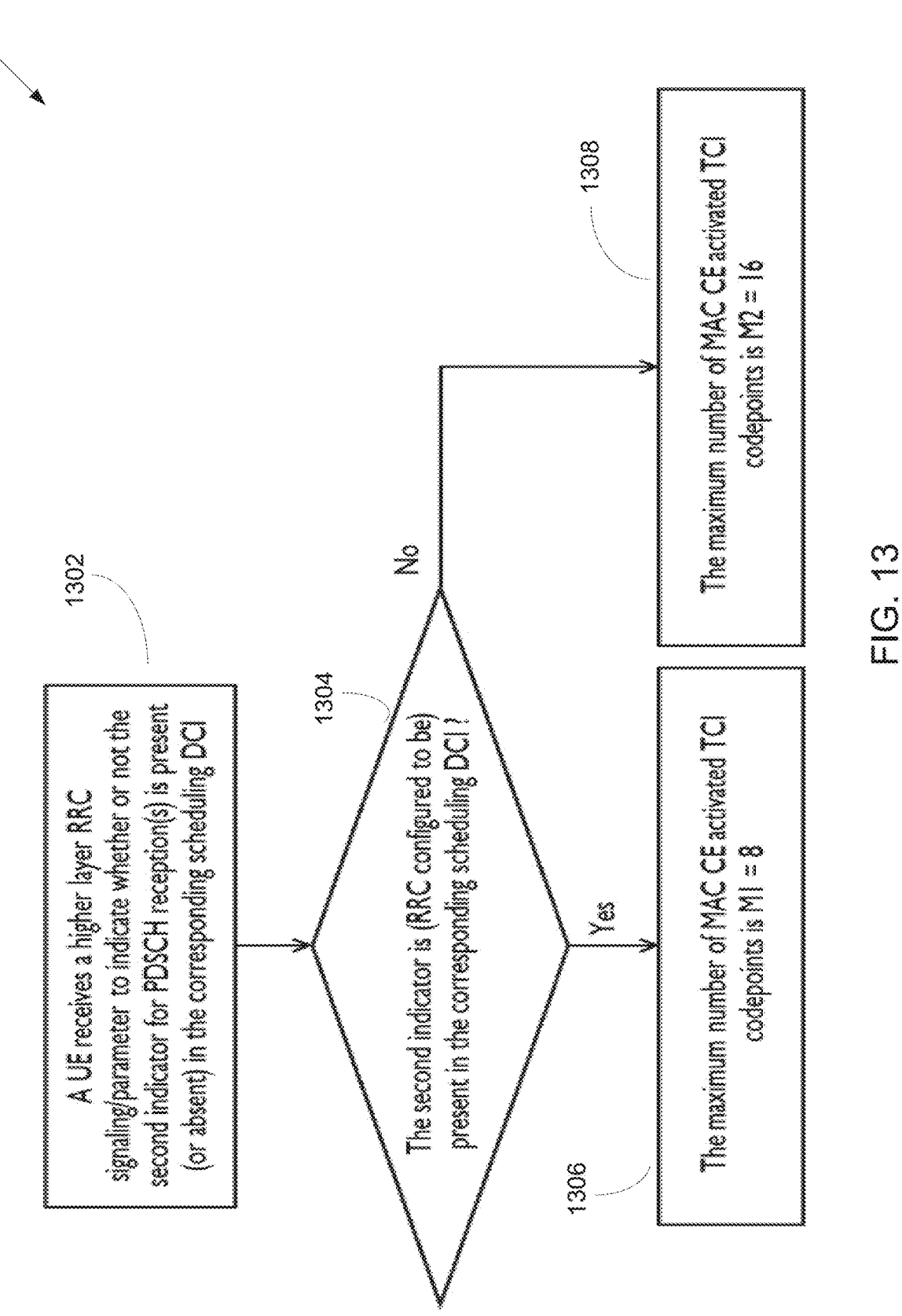

METHOD AND APPARATUS FOR DCI BASED DYNAMIC BEAM INDICATION

CROSS-REFERENCE TO RELATED APPLICATIONS AND CLAIM OF PRIORITY

The present application claims priority to:

U.S. Provisional Patent Application No. 63/322,860, filed on Mar. 23, 2022;

U.S. Provisional Patent Application No. 63/326,018, filed on Mar. 31, 2022;

U.S. Provisional Patent Application No. 63/340,376, filed on May 10, 2022;

U.S. Provisional Patent Application No. 63/404,050, filed on Sep. 6, 2022;

U.S. Provisional Patent Application No. 63/424,734, filed on Nov. 11, 2022; and

U.S. Provisional Patent Application No. 63/447,810, filed on Feb. 23, 2023. The contents of the above-identified patent documents are incorporated herein by reference.

TECHNICAL FIELD

The present disclosure relates generally to wireless communication systems and, more specifically, the present disclosure relates to a downlink control information (DCI) based dynamic beam indication in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a DCI based dynamic beam indication in a wireless communication system.

In one embodiment, a user equipment (UE) is provided. The UE includes a transceiver configured to receive, in a first medium access control-control element (MAC CE), K sets of transmission configuration indication (TCI) states; receive, in a first DCI, a set of TCI states including two TCI states; receive a higher layer radio resource control (RRC) signaling including a parameter indicating whether or not a TCI state selection indicator is present in a second DCI that schedules a physical downlink shared channel (PDSCH); and receive the second DCI. The UE further includes a processor operably coupled to the transceiver. The processor is configured to determine, based on the parameter, whether the TCI state selection indicator is present in the second DCI and identify, based on a presence or absence of the TCI state selection indicator, at least one TCI state from the set of TCI states to be used in reception of the PDSCH. The transceiver is further configured to receive, based on the identified at least one TCI state, the PDSCH.

In another embodiment, a BS is provided. The BS includes a transceiver configured to transmit, in a first MAC CE, K sets of TCI states; transmit, in a first DCI, a set of TCI states including two TCI states; and transmit a higher layer RRC signaling including a parameter indicating whether or not a TCI state selection indicator is present in a second DCI that schedules a PDSCH. A presence or absence of the TCI state selection indicator in the second DCI indicates at least one TCI state from the set of TCI states to be used for reception of the PDSCH. The transceiver is further configured to transmit the PDSCH for reception based on the at least one TCI state.

In yet another embodiment, a method performed by a UE is provided. The method includes receiving, in a first MAC CE, K sets of TCI states; receiving, in a first DCI, a set of TCI states including two TCI states; receiving a higher layer RRC signaling including a parameter indicating whether or not a TCI state selection indicator is present in a second DCI that schedules a (PDSCH; and receiving the second DCI. The method further includes determining, based on the parameter, whether the TCI state selection indicator is present in the second DCI; identifying, based on a presence or absence of the TCI state selection indicator, at least one TCI state from the set of TCI states to be used in reception of the PDSCH; and receiving, based on the identified at least one TCI state, the PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example of determination for a maximum number of MAC CE activated TCI codepoints according to embodiments of the present disclosure.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
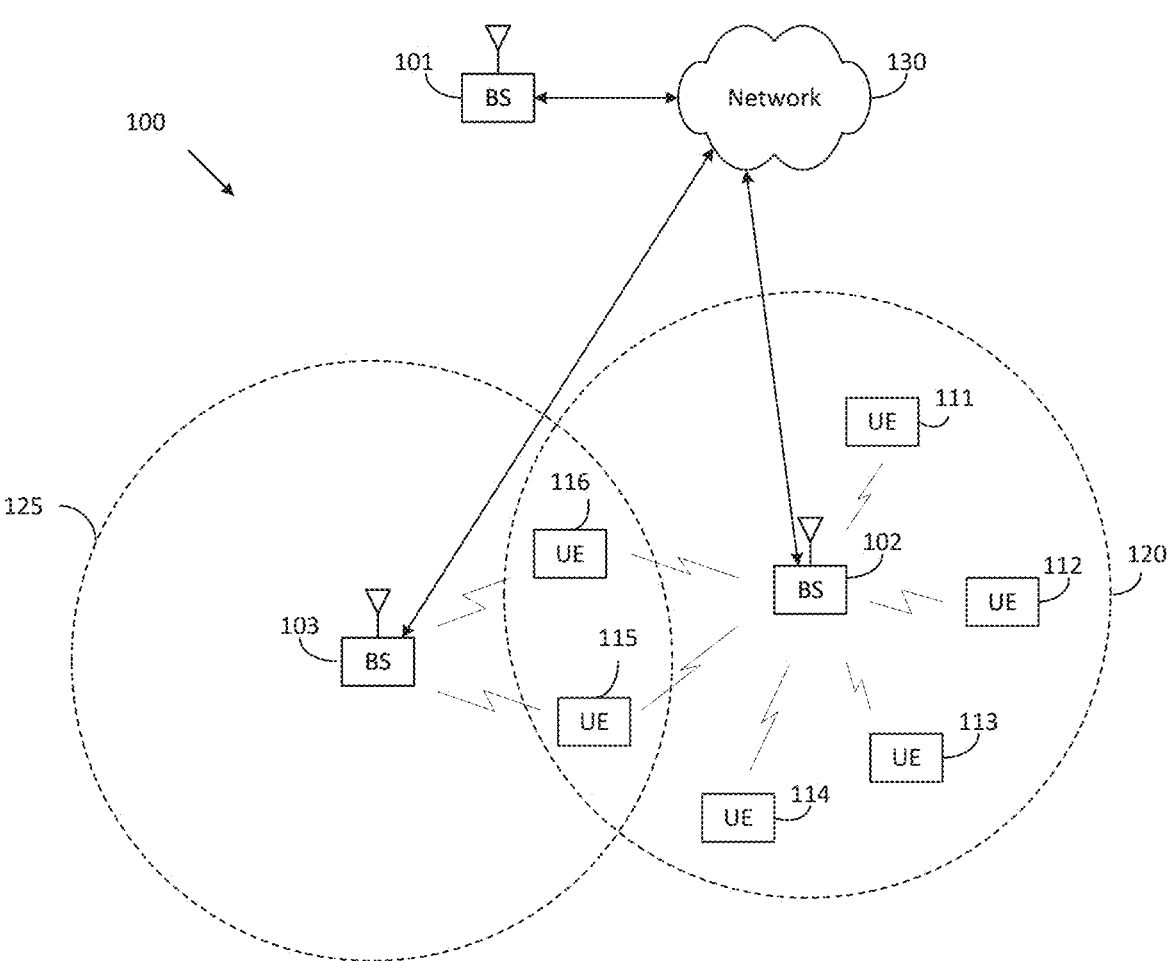
FIG. 1 illustrates an example of wireless network according to embodiments of the present disclosure.
Figure 2:
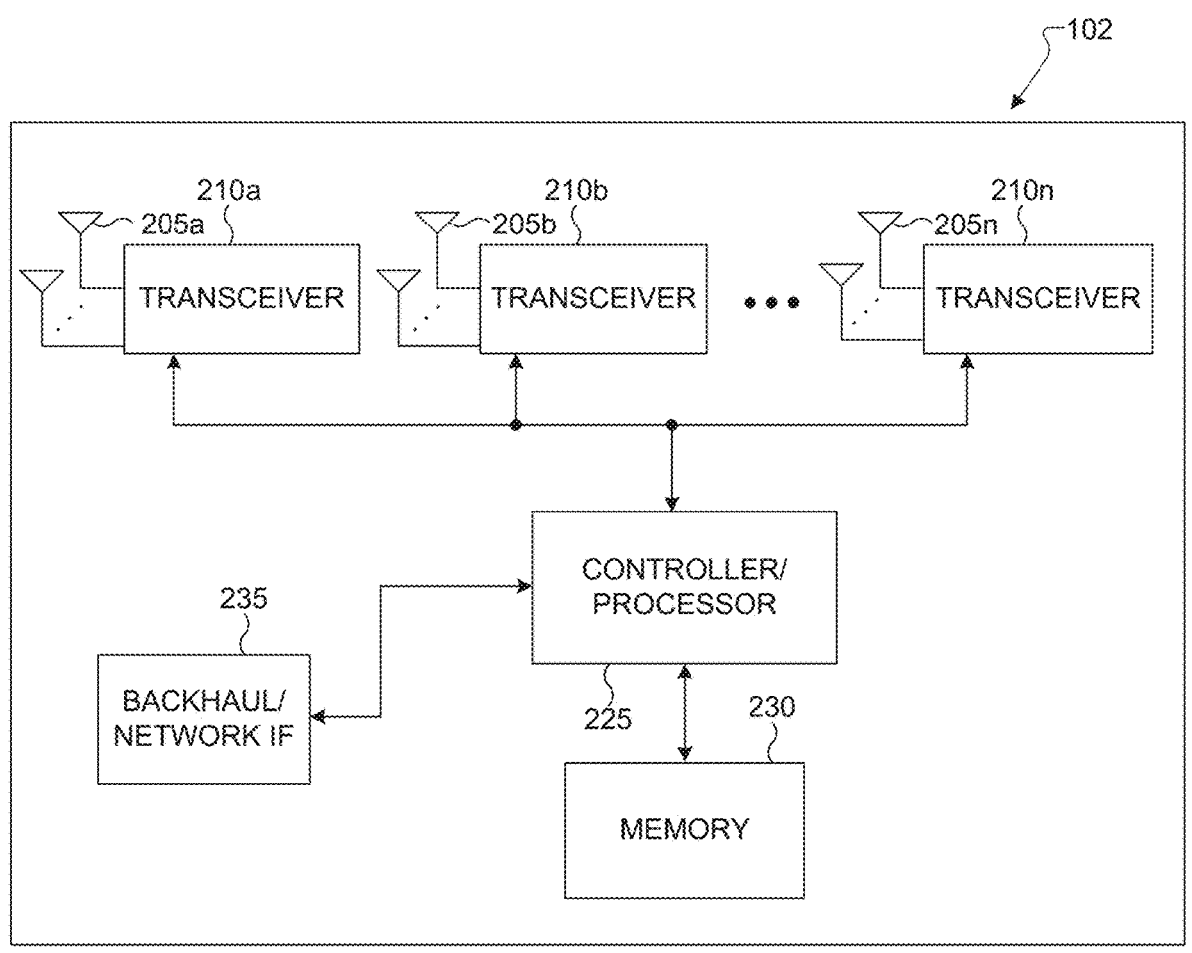
FIG. 2 illustrates an example of gNB according to embodiments of the present disclosure.
Figure 3:
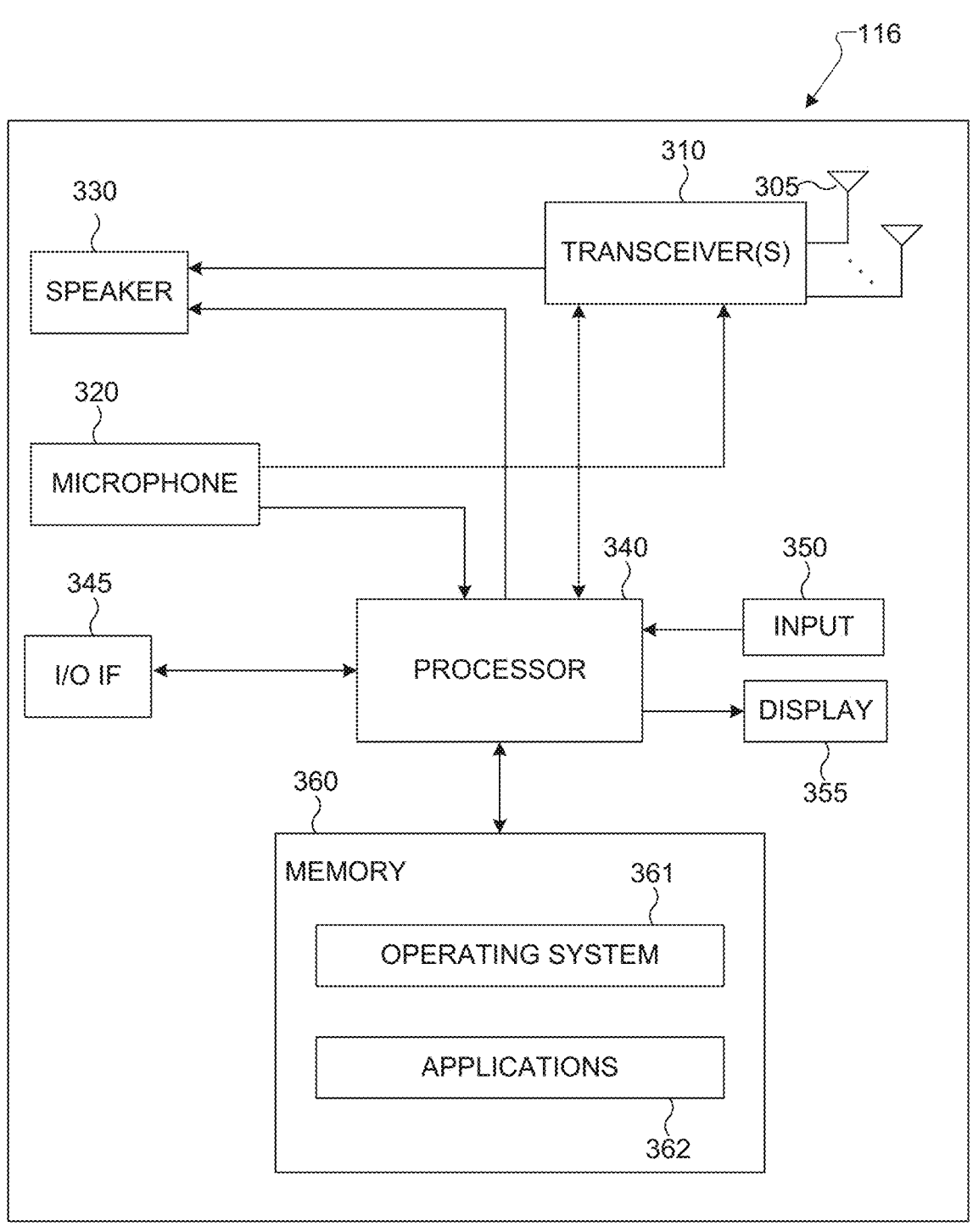
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a DCI based dynamic beam indication in a wireless communication system. In certain embodiments, and one or more of the gNBs 101-103 includes circuitry, programing, or a combination thereof, for a DCI based dynamic beam indication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNB s 101 and 103 of FIG. 1 could have the same or similar configuration. However, gNB s come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for a DCI based dynamic beam indication in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a DCI based dynamic beam indication in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
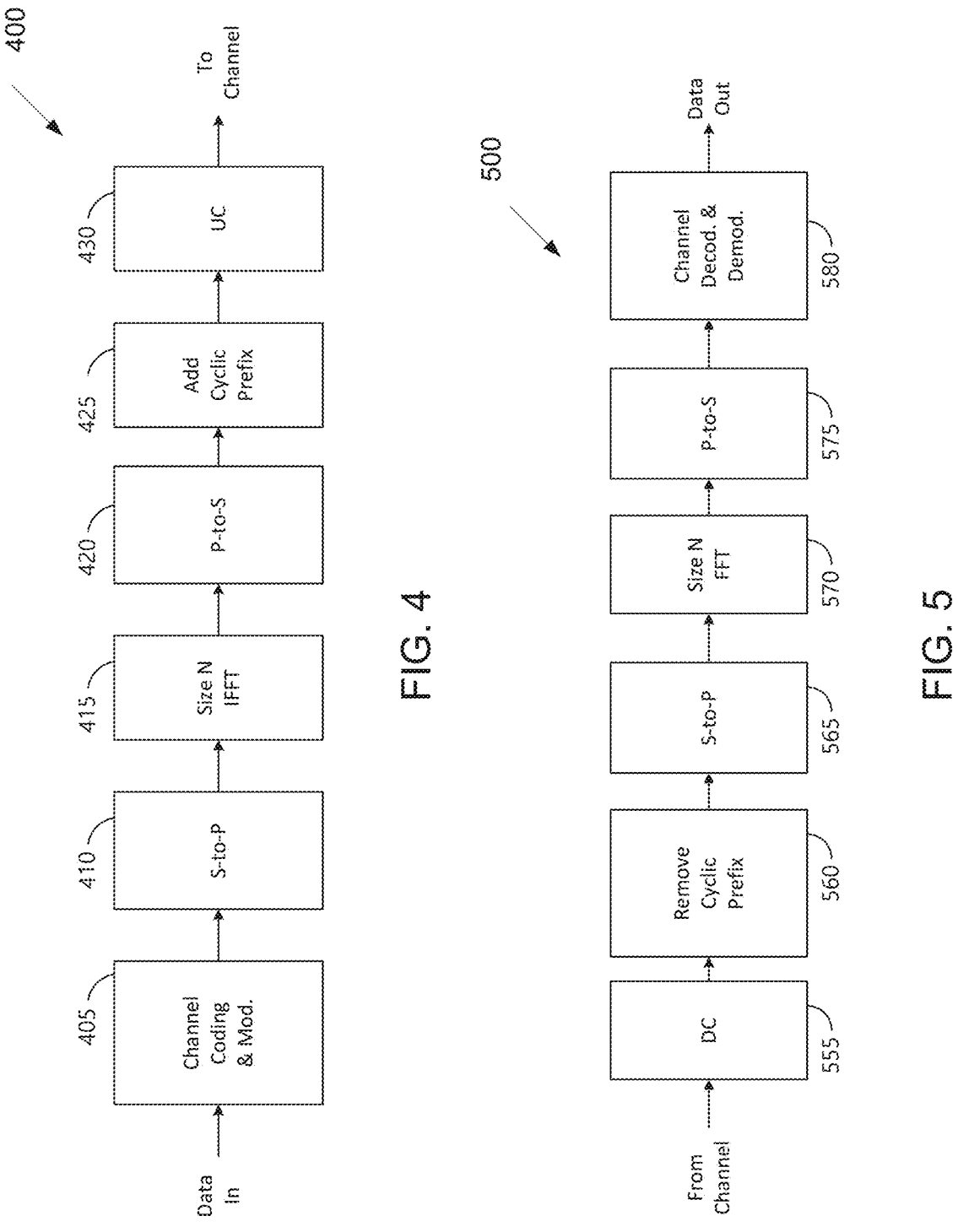
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support DCI based dynamic beam indication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
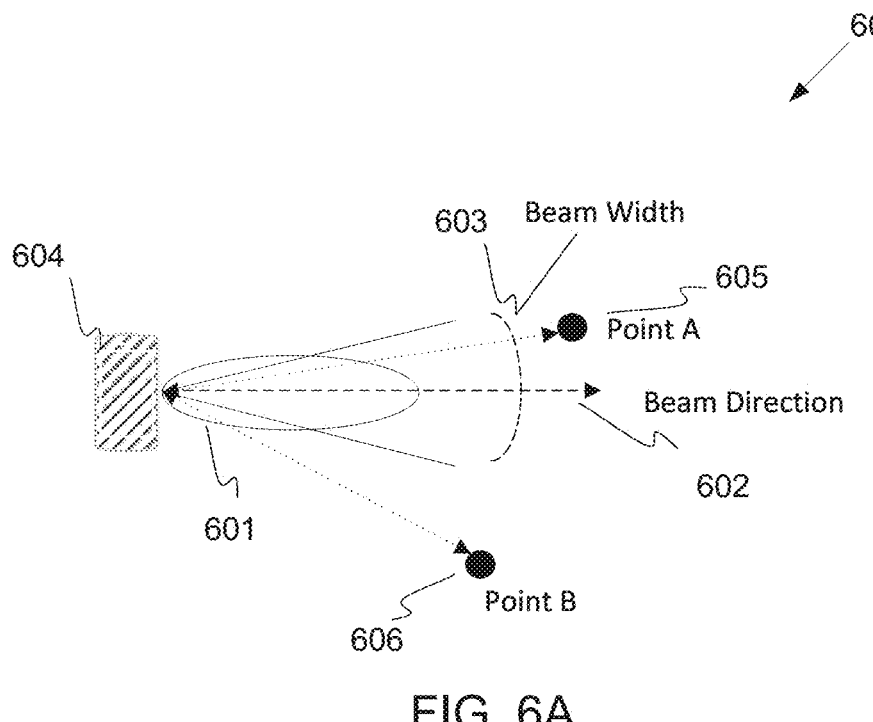
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
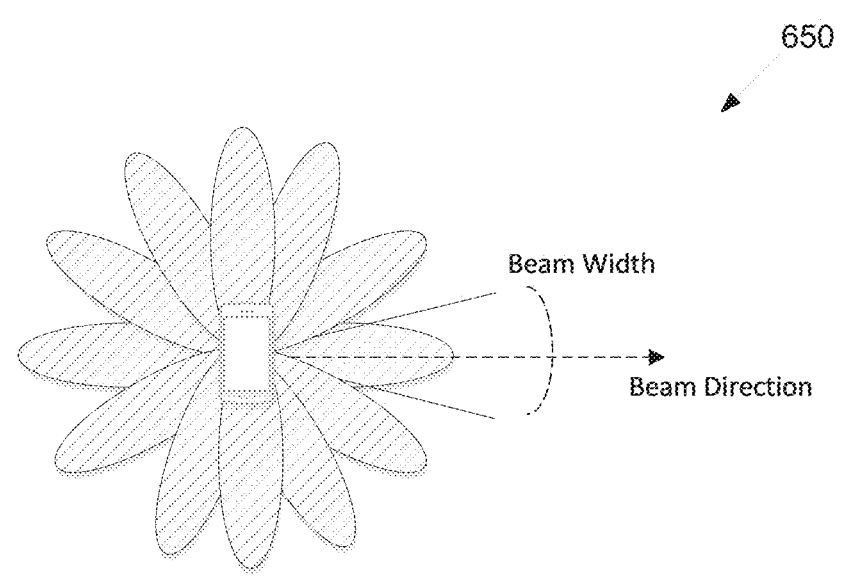
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
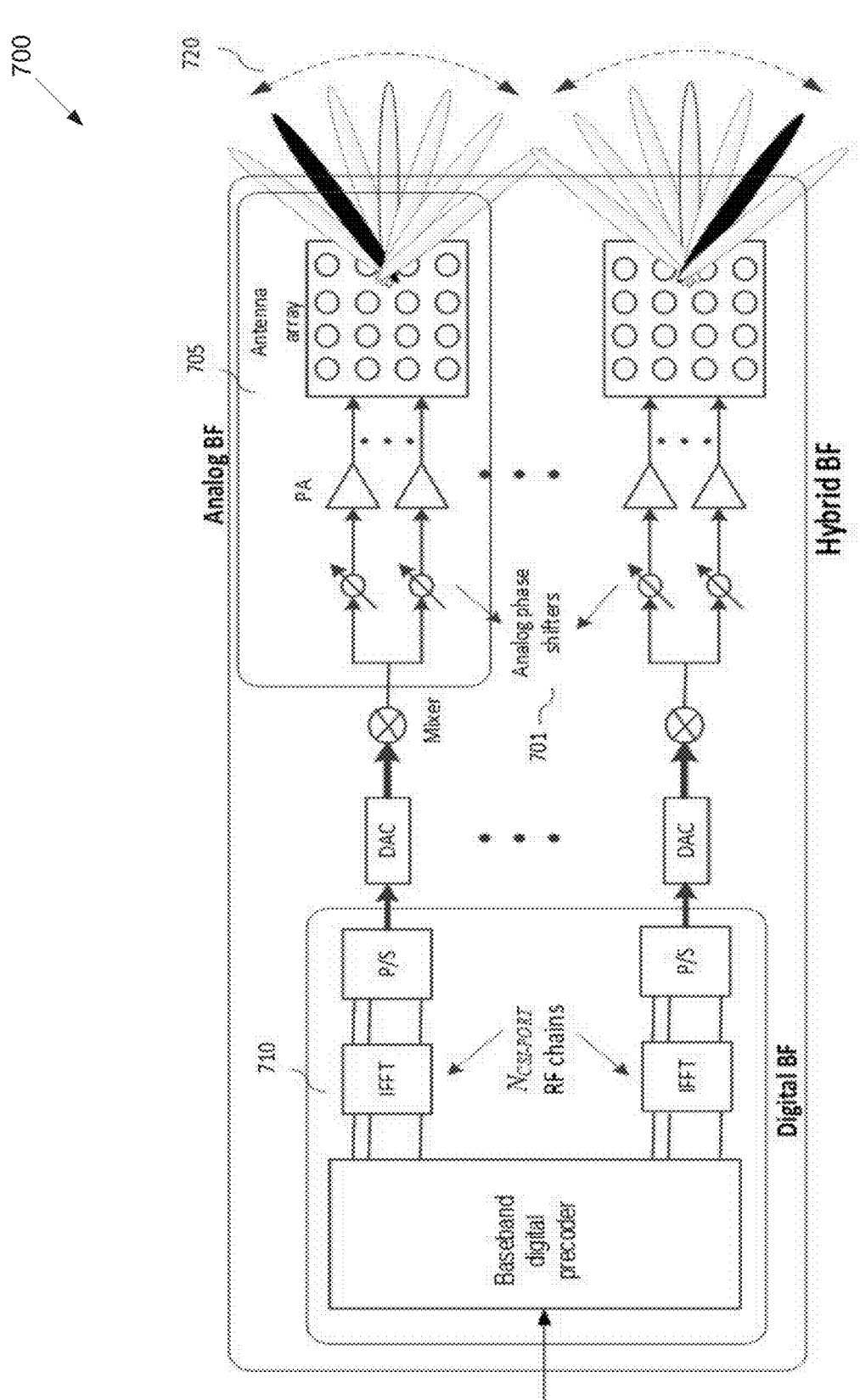
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 8:
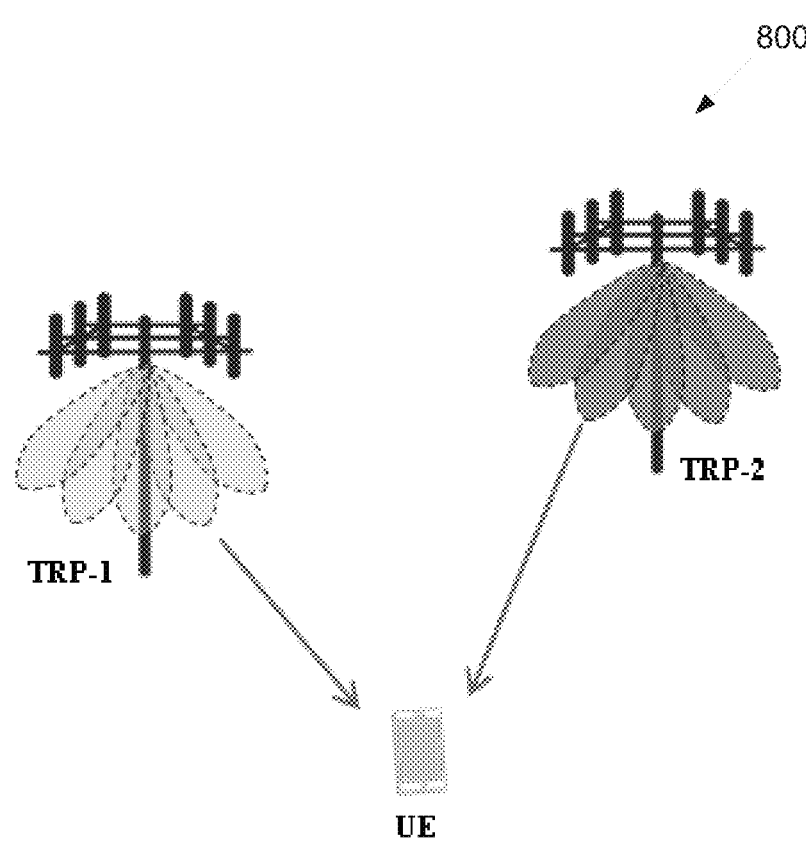
FIG. 8 illustrates an example of multiple transmission and reception point system according to embodiments of the present disclosure.

FIG. 8 illustrates an example of multiple transmission and reception point system 800 according to embodiments of the present disclosure. An embodiment of the multiple transmission and reception point system 800 shown in FIG. 8 is for illustration only.

In a multiple transmission and reception point (TRP) system depicted in FIG. 8, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and (5) A plurality of CORESETs associated with a TRP-specific index/indicator/identity.

A cell/TRP in an inter-cell system (e.g., an inter-cell multi-TRP system) could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, in an inter-cell system, different cells/TRPs could broadcast different PCIs, and/or one or more cells/TRPs (referred to/defined as non-serving cells/TRPs in the present disclosure) could broadcast different PCIs from that of the serving cell/TRP (i.e., the serving cell PCI), and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

In Rel. 17, a unified transmission configuration indication (TCI) framework is specified for single-TRP operation, wherein a common beam could be indicated for all UE-dedicated control and/or data channels. To extend the Rel. 17 unified TCI framework to the multi-TRP operation, various design aspects such as means of configurating one or more TCI fields or TCI state codepoints in a downlink control information (DCI) format (e.g., DCI format 1_1 or 1_2 with or without DL assignment) to indicate beams for multiple TRPs need to be specified.

The present disclosure provides various embodiments for enabling DCI based beam indication for multi-TRP operation. In particular, detailed configuration methods of TCI states, TCI fields or TCI state codepoints in DCI format 1_1 or 1_2 with or without DL assignment, and their association with different TRPs in a multi-TRP system, are specified/provided in the present disclosure. The embodiments in this disclosure allows for the use of Rel. 17 unified TCI framework in multi-TRP operations. Throughout the present disclosure, a TCI state codepoint (e.g., in a DCI) is equivalent to/same as a TCI codepoint (e.g., in a DCI), and they can be used exchangeably. Furthermore, throughout the present disclosure, a TCI field (e.g., in a DCI) is equivalent to/same as a TCI state field (e.g., in a DCI), and they can be used exchangeably.

As described in U.S. patent application Ser. No. 17/584, 239, which is incorporated by reference into the present disclosure, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in U.S. patent application Ser. No. 17/584,239, which is incorporated by reference into the present disclosure, the following examples can be provided.

In one example, a MAC CE could be used to indicate to the UE a beam (i.e., a TCI state and/or a TCI state ID) for the transmission/reception of a PDCCH or a PDSCH.

In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

As discussed above, a UE could be provided by the network, e.g., via MAC CE or DCI (e.g., DCI format 1_1 or 1_2 with or without DL assignment) based signaling via higher layer parameters DLorJointTCIState or UL-TCIState, M>1 joint DL and UL TCI states or M>1 separate UL TCI states or a first combination of M>1 joint DL and UL TCI states and separate UL TCI states or N>1 separate DL TCI states or a second combination of N>1 joint DL and UL TCI states and separate DL TCI states or a third combination of N>1 joint DL and UL TCI states, separate DL TCI states and separate UL Rel. 17 unified TCI for UE-dedicated reception on PDSCH/PDCCH or dynamic-grant/configured-grant based PUSCH and all of dedicated PUCCH resources.

In one embodiment, the UE could be configured/provided/indicated, e.g., via higher layer RRC signaling and/or MAC CE command and/or dynamic DCI based L1 signaling, M>1 or N>1 (e.g., M=2 or N=2) groups of SSBs or SSB indexes with each group comprising/containing/including one or more SSBs or SSB indexes. The bitwidth of the SSB index in each group could be determined according to the total number of SSBs/SSB indexes in the corresponding group. Alternatively, the bitwidth of the SSB index in each group could be determined according to the total number of SSBs/SSB indexes across all the configured groups. Furthermore, the SSB index(es) in different groups may not overlap—i.e., different groups may not comprise/include/contain the same SSB(s) or SSB index(es). For M=2 or N=2, the UE could be configured/provided/indicated by the network, e.g., via higher layer RRC signaling and/or MAC CE command and/or dynamic DCI based L1 signaling, a first group of SSBs/SSB indexes and a second group of SSBs/SSB indexes as specified herein in the present disclosure.

As specified herein in the present disclosure, the UE could be indicated, e.g., via unified TCI state activation/indication MAC CE or beam indication DCI (e.g., DCI format 1_1 or 1_2 with or without DL assignment), M>1 or N>1 (e.g., M=2 or N=2) TCI states of a TCI codepoint each provided by DLorJoint-TCIState or ULTCI-State. When/if the UE is configured/provided/indicated by the network, e.g., via higher layer RRC signaling and/or MAC CE command and/or dynamic DCI based L1 signaling, M>1 or N>1 (e.g., M=2 or N=2) groups of SSBs or SSB indexes as specified herein in the present disclosure, the UE could be indicated, e.g., via unified TCI state activation/indication MAC CE or beam indication DCI (e.g., DCI format 1_1 or 1_2 with or without DL assignment), M>1 or N>1 (e.g., M=2 or N=2) TCI states of a TCI codepoint each provided by DLorJoint-TCIState or ULTCI-State. Furthermore, the RS(s) in each of the indicated TCI states of a TCI codepoint could correspond to the SSB(s)/SSB index(es) from a different group of SSBs/SSB indexes, or the RS(s) in each of the indicated TCI states of a TCI codepoint could be quasi co-located with the SSB(s)/SSB index(es) from a different group of SSBs/SSB indexes.

For M=2 or N=2, when/if the UE is configured/provided/indicated by the network, e.g., via higher layer RRC signaling and/or MAC CE command and/or dynamic DCI based L1 signaling, the first group of SSBs or SSB indexes and the second group of SSBs or SSB indexes as specified herein in the present disclosure, the UE could be indicated, e.g., via unified TCI state activation/indication MAC CE or beam indication DCI (e.g., DCI format 1_1 or 1_2 with or without DL assignment), a first TCI state/pair of TCI states and a second TCI state/pair of TCI states of a TCI codepoint each provided by DLorJoint-TCIState or ULTCI-State. Furthermore, the RS(s) in the indicated first TCI state/pair of TCI states of a TCI codepoint could correspond to the SSB(s)/SSB index(es) from the first (or second) group, or the RS(s) in the indicated first TCI state/pair of TCI states of a TCI codepoint could be quasi co-located with the SSB(s)/SSB index(es) from the first (or second) group; while, the RS(s) in the indicated second TCI state/pair of TCI states of a TCI codepoint could correspond to the SSB(s)/SSB index(es) from the second (or first) group, or the RS(s) in the indicated second TCI state/pair of TCI states of a TCI codepoint could be quasi co-located with the SSB(s)/SSB index(es) from the second (or first) group.

In one embodiment, the UE could be configured/provided/indicated, e.g., via higher layer RRC signaling and/or MAC CE command and/or dynamic DCI based L1 signaling, M>1 or N>1 (e.g., M=2 or N=2) groups/lists of TCI states or TCI state IDs with each group/list comprising/containing/including one or more TCI states or TCI state IDs. The bitwidth of the TCI state ID in each group/list could be determined according to the total number of TCI states/TCI state IDs in the corresponding group/list. Alternatively, the bitwidth of the TCI state ID in each group/list could be determined according to the total number of TCI states/TCI state IDs across all the configured groups/lists. Furthermore, the TCI state ID(s) in different groups/lists may not overlap—i.e., different groups/lists may not comprise/include/contain the same TCI state(s) or TCI state ID(s). For M=2 or N=2, the UE could be configured/provided/indicated by the network, e.g., via higher layer RRC signaling and/or MAC CE command and/or dynamic DCI based L1 signaling, a first group/list of TCI states/TCI state IDs and a second group/list of TCI states/TCI state IDs as specified herein in the present disclosure.

As specified herein in the present disclosure, the UE could be indicated, e.g., via unified TCI state activation/indication MAC CE or beam indication DCI (e.g., DCI format 1_1 or 1_2 with or without DL assignment), M>1 or N>1 (e.g., M=2 or N=2) TCI states of a TCI codepoint each provided by DLorJoint-TCIState or ULTCI-State. When/if the UE is configured/provided/indicated by the network, e.g., via higher layer RRC signaling and/or MAC CE command and/or dynamic DCI based L1 signaling, M>1 or N>1 (e.g., M=2 or N=2) groups/lists of TCI states or TCI state IDs as specified herein in the present disclosure, the UE could be indicated, e.g., via unified TCI state activation/indication MAC CE or beam indication DCI (e.g., DCI format 1_1 or 1_2 with or without DL assignment), M>1 or N>1 (e.g., M=2 or N=2) TCI states of a TCI codepoint each provided by DLorJoint-TCIState or ULTCI-State. Furthermore, each of the indicated TCI states of a TCI codepoint could be from a different group/list of TCI states/TCI state IDs.

For M=2 or N=2, when/if the UE is configured/provided/indicated by the network, e.g., via higher layer RRC signaling and/or MAC CE command and/or dynamic DCI based L1 signaling, the first group/list of TCI states or TCI state IDs and the second group/list of TCI states or TCI state IDs as specified herein in the present disclosure, the UE could be indicated, e.g., via unified TCI state activation/indication MAC CE or beam indication DCI (e.g., DCI format 1_1 or 1_2 with or without DL assignment), a first TCI state/pair of TCI states and a second TCI state/pair of TCI states of a TCI codepoint each provided by DLorJoint-TCIState or ULTCI-State. Furthermore, the indicated first TCI state/pair of TCI states of a TCI codepoint could be from the first (or second) group/list of TCI states/TCI state IDs, while, the indicated second TCI state/pair of TCI states of a TCI codepoint could be from the second (or first) group/list of TCI states/TCI state IDs.

The UE could be a higher layer configured by the network M>1 or N>1 pools of TCI states or TCI state identities (IDs). As aforementioned, here, a TCI state could correspond to a separate DL TCI state provided by DLorJointTCIState, or a separate UL TCI state provided by UL-TCIState, or a joint DL and UL TCI state provided by DLorJointTCIState. Each of the higher layer configured M>1 or N>1 pools of TCI states/TCI state IDs could be associated with an entity ID. In the present disclosure, the entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. In the present disclosure, the UE could be higher layer configured by the network a list of entity IDs or a list of PCIs or a set of PCI indexes with each PCI index pointing to an entry/PCI in the list of PCIs that are higher layer configured to the UE.

In one example, the first pool of TCI states/TCI state IDs could be associated with the lowest PCI value or the first PCI value in the higher layer configured list of PCIs or the lowest PCI index or the first PCI index in the set of PCI indexes or the PCI index pointing to the lowest PCI value in the higher layer configured list of PCIs, the second pool of TCI states/TCI state IDs could be associated with the second lowest PCI value or the second PCI value in the higher layer configured list of PCIs or the second lowest PCI index or the second PCI index in the set of PCI indexes or the PCI index pointing to the second lowest PCI value in the higher layer configured list of PCIs, and so on, and the last pool of TCI states/TCI state IDs could be associated with the highest PCI value or the last PCI value in the higher layer configured list of PCIs or the highest PCI index or the last PCI index in the set of PCI indexes or the PCI index pointing to the highest PCI value in the higher layer configured list of PCIs. Or equivalently, the m-th (or n-th) pool of TCI states/TCI state IDs could be associated with the m-th (or n-th) lowest (or highest) PCI value or the m-th (or n-th) PCI value in the higher layer configured list of PCIs or the m-th (or n-th) lowest (or highest) PCI index or the first PCI index in the set of PCI indexes or the PCI index pointing to the m-th (or n-th) lowest (or highest) PCI value in the higher layer configured list of PCIs, where $m \in \{1, \ldots, M\}$ and $n \in \{1, \ldots, N\}$.

For M=2 (or N=2), the first (or second) pool of TCI states/TCI state IDs could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) pool of TCI states/TCI state IDs could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In another example, if the UE is provided in PDCCH-Config two values of CORESETPoolIndex (i.e., 0 and 1), for M=2 (or N=2), the first (or second) pool of TCI states/TCI state IDs could be associated with value 0 of CORESET-PoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) pool of TCI states/TCI state IDs could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In yet another example, each of the M>1 (or N>1) pools of TCI states/TCI state IDs could be configured to the UE via a separate higher layer parameter. That is, the UE could be configured by the network M>1 (or N>1) separate higher layer parameters each configuring/indicating a pool of TCI states/TCI state IDs. Furthermore, the higher layer parameter that configures a pool of TCI states/TCI state IDs could also include/indicate an entity ID as described above. For this case, a pool TCI states/TCI state IDs and an entity ID are associated if the pool of TCI states/TCI state IDs and the entity ID are configured/indicated via the same higher layer parameter.

In addition, when the UE is higher layer configured by the network M>1 or N>1 pools of TCI states or TCI state IDs, where each TCI state configured therein corresponds to a separate DL TCI state provided by DLorJointTCIState, or a separate UL TCI state provided by UL-TCIState, or a joint DL and UL TCI state provided by DLorJointTCIState, In one example, for the m-th (or n-th) pool of TCI states/TCI state IDs comprising K(m) (or K(n)) TCI states/

TCI state IDs where $m \in \{1, \ldots, M\}$ and $n \in \{1, \ldots, N\}$, the TCI state IDs in the m-th (or n-th) pool of TCI states/TCI state IDs or the TCI states in the m-th (or n-th) pool of TCI states/TCI state IDs are indexed according to $0, \ldots, K(m)-1$ (or $K(n)-1$) or $1, \ldots, K(m)$ (or $K(n)$). For example, for M=2 (or N=2), the first pool of TCI states/TCI state IDs could comprise K1 (e.g., 64) TCI states/TCI state IDs, and the second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to $0, \ldots, K1-1$ (e.g., $0, \ldots, 63$) or $1, \ldots, K1$ (e.g., $1, \ldots, 64$), and the TCI state IDs in the second pool of TCI states/TCI state IDs or the TCI states in the second pool of TCI states/TCI state IDs could be indexed according to $0, \ldots, K2-1$ (e.g., $0, \ldots, 63$) or $1, \ldots, K2$ (e.g., $1, \ldots, 64$).

In another example, the m-th (or n-th) pool of TCI states/TCI state IDs could comprise K(m) (or K(n)) TCI states/TCI state IDs where $m \in \{1, \ldots, M\}$ and $n \in \{1, \ldots, N\}$. For this case, the TCI state IDs in the m-th (or n-th) pool of TCI states/TCI state IDs or the TCI states in the m-th (or n-th) pool of TCI states/TCI state IDs are indexed according to $\Sigma_{i=1}^{m-1} K(i)$ (or $\Sigma_{j=1}^{n-1} K(j)$), $\ldots$, $\Sigma_{i=1}^{m-1} K(i)+K(m)-1$ (or $\Sigma_{j=1}^{n-1} K(j)+K(n)-1$) or $\Sigma_{i=1}^{m-1} K(i)+1$ (or $\Sigma_{j=1}^{n-1} K(j)+1$), $\ldots$, $\Sigma_{i=1}^{m-1} K(i)+K(m)$ (or $\Sigma_{j=1}^{n-1} K(j)+K(n)$), where $\Sigma_{i=1}^{0} K(i)=0$ (or $\Sigma_{j=1}^{n-1} K(j)=0$).

For example, for M=2 (or N=2), the first pool of TCI states/TCI state IDs could comprise K1 (e.g., 64) TCI states/TCI state IDs, and the second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to $0, \ldots, K1-1$ (e.g., $0, \ldots, 63$) or $1, \ldots, K1$ (e.g., $1, \ldots, 64$), and the TCI state IDs in the second pool of TCI states/TCI state IDs or the TCI states in the second pool of TCI states/TCI state IDs could be indexed according to $K1, \ldots, K1+K2-1$ (e.g., $64, \ldots, 127$) or $K1+1, \ldots, K1+K2$ (e.g., $65, \ldots, 128$).

Alternatively, the UE could be higher layer configured by the network a single pool of TCI states or TCI state IDs. As aforementioned, here, a TCI state could correspond to a separate DL TCI state provided by DLorJointTCIState, or a separate UL TCI state provided by UL-TCIState, or a joint DL and UL TCI state provided by DLorJointTCIState. A TCI state or TCI state ID configured in the pool of TCI states/TCI state IDs could be associated with an entity ID. In the present disclosure, the entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc.

Furthermore, one or more of the TCI states or TCI state IDs configured in the pool of TCI states/TCI state IDs could be associated with the same entity ID, and different TCI states or TCI state IDs configured in the pool of TCI states/TCI state IDs could be associated with different entity IDs. In the present disclosure, the TCI states or TCI state IDs in the pool of TCI states/TCI state IDs could be divided/partitioned into M>1 (or N>1) TCI state groups each comprising one or more TCI states/TCI state IDs. The TCI states or TCI state IDs in the same TCI state group are associated with the same entity ID.

In one example, the m-th (or n-th) TCI state group could comprise K(m) (or K(n)) TCI states/TCI state IDs where $m \in \{1, \ldots, M\}$ and $n \in \{1, \ldots, N\}$. For this case, the TCI state IDs in the m-th (or n-th) TCI state group or the TCI states in the m-th (or n-th) TCI state group are indexed according to $\Sigma_{i=1}^{m-1} K(i)$ (or $\Sigma_{j=1}^{n-1} K(j)$), . . . , $\Sigma_{i=1}^{m-1} K(i) + K(m) - 1$ (or $\Sigma_{j=1}^{n-1} K(j) + K(n) - 1$) or $\Sigma_{i=1}^{m-1} K(i) + 1$ (or $\Sigma_{j=1}^{n-1} K(j) + 1$), . . . , $\Sigma_{i=1}^{m-1} K(i) + K(m)$ (or $\Sigma_{j=1}^{n-1} K(j) + K(n)$), where $\Sigma_{i=1}^{0} K(i) = 0$ (or $\Sigma_{j=1}^{n-1} K(j)) = 0$). For example, for M=2 (or N=2), the first TCI state group could comprise K1 (e.g., 32) TCI states/TCI state IDs in the pool of TCI states/TCI state IDs, and the second TCI state group could comprise K2 (e.g., 32) TCI states/TCI state IDs in the pool of TCI states/TCI state IDs. For this example, the TCI state IDs in the first TCI state group or the TCI states in the first TCI state group could be indexed according to 0, . . . , K1−1 (e.g., 0, . . . , 31) or 1, . . . , K1 (e.g., 1, . . . , 32), and the TCI state IDs in the second TCI state group or the TCI states in the second TCI state group could be indexed according to K1, . . . , K1+K2−1 (e.g., 32, . . . , 63) or K1+1, . . . , K1+K2 (e.g., 33, . . . , 65).

For this example, the UE could be configured by the network, e.g., via higher layer RRC signaling, the number of TCI states/TCI state IDs (e.g., K(m) or K(n) with $m \in \{1, \ldots, M\}$ and $n \in \{1, \ldots, N\}$) in each of the TCI state groups (e.g., the m-th or the n-th TCI state group with $m \in \{1, \ldots, M\}$ and $n \in \{1, \ldots, N\}$) configured in the pool of TCI states/TCI state IDs.

In another example, the UE could be configured by the network M>1 (or N>1) parameters (e.g., higher layer RRC parameters) each associated with/corresponding to/configured for a TCI state group. Each parameter could include/indicate one or more TCI states/TCI state IDs. For this case, the TCI state group associated with the parameter could comprise the one or more TCI states/TCI state IDs configured in the parameter.

In the present disclosure, the UE could be higher layer configured by the network a list of entity IDs or a list of PCIs or a set of PCI indexes with each PCI index pointing to an entry/PCI in the list of PCIs that are higher layer configured to the UE.

In one example, the first TCI state group could be associated with the lowest PCI value or the first PCI value in the higher layer configured list of PCIs or the lowest PCI index or the first PCI index in the set of PCI indexes or the PCI index pointing to the lowest PCI value in the higher layer configured list of PCIs, the second TCI state group could be associated with the second lowest PCI value or the second PCI value in the higher layer configured list of PCIs or the second lowest PCI index or the second PCI index in the set of PCI indexes or the PCI index pointing to the second lowest PCI value in the higher layer configured list of PCIs, and so on, and the last TCI state group could be associated with the highest PCI value or the last PCI value in the higher layer configured list of PCIs or the highest PCI index or the last PCI index in the set of PCI indexes or the PCI index pointing to the highest PCI value in the higher layer configured list of PCIs.

Or equivalently, the m-th (or n-th) TCI state group could be associated with the m-th (or n-th) lowest (or highest) PCI value or the m-th (or n-th) PCI value in the higher layer configured list of PCIs or the m-th (or n-th) lowest (or highest) PCI index or the first PCI index in the set of PCI indexes or the PCI index pointing to the m-th (or n-th) lowest (or highest) PCI value in the higher layer configured list of PCIs, where $m \in \{1, \ldots, M\}$ and $n \in \{1, \ldots, N\}$. For M=2 (or N=2), the first (or second) TCI state group could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state group could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In another example, if the UE is provided in PDCCH-Config two values of CORESETPoolIndex (i.e., 0 and 1), for M=2 (or N=2), the first (or second) TCI state group could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state group could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In yet another example, the (higher layer) parameter discussed in the mentioned that indicates one or more TCI states/TCI state IDs for a TCI state group could also include/indicate an entity ID as described above. For this case, a TCI state group and an entity ID are associated if the TCI state group and the entity ID are associated with the same (higher layer) parameter specified in the mentioned example in the present disclosure.

The UE could receive from the network one or more MAC CE subselection/activation commands activating one or more TCI states/TCI state IDs from the one or more TCI state pools or the one or more TCI state groups used to map up to $Nc \geq 1$ (e.g., 8, 16, 32 or 64) TCI state codepoints in a DCI format. For instance, the UE could receive from the network a MAC CE subselection/activation command—e.g., a unified TCI state activation/deactivation for UE-specific PDSCH MAC CE—activating one or more TCI states/TCI state IDs from the one or more TCI state pools or the one or more TCI state groups used to map up to 8 (i.e., with the same maximum number of TCI codepoints as that in Rel-16/17) or 16 (i.e., with an increased maximum number of TCI codepoints in contrast to that in Rel-16/17) TCI state codepoints in a DCI format (e.g., DCI format 1_1 or 1_2 with or without DL assignment). That is, if up to 16 TCI state codepoints activated by the MAC CE could be mapped to a TCI field in a DCI format (e.g., 1_1 or 1_2 with or without DL assignment), the maximum number of the TCI field bits is 4, which is (one bit) larger than the maximum number of TCI field bits specified in Rel-16/17 (i.e., 3), where up to 8 TCI state codepoints activated by the MAC CE could be mapped to a TCI field in a DCI (e.g., 1_1 or 1_2 with or without DL assignment).

In one example, for M=2 (or N=2), the UE could receive from the network a MAC CE subselection/activation command activating a set of $Nc \geq 1$ (e.g., 8, 16, 32 or 64) TCI state codepoints mapped to a TCI field in a DCI. For instance, the UE could receive from the network a MAC CE subselection/ activation command—e.g., a unified TCI state activation/ deactivation for UE-specific PDSCH MAC CE—activating a set of 8 (the corresponding number of TCI field bits is 3) or 16 (the corresponding number of TCI field bits is 4) TCI state codepoints mapped to a TCI field in a DCI. In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, a codepoint could correspond to a TCI state, wherein the TCI state could be a separate DL TCI state provided by DLorJointTCIState, a separate UL TCI state provided by UL-TCIState, or a joint DL and UL TCI state provided by DLorJointTCIState.

Yet for another example, a codepoint could correspond to a pair of two TCI states, wherein the first TCI state in the pair could be a separate DL TCI state provided by DLorJointT-CIState, a separate UL TCI state provided by UL-TCIState or a joint DL and UL TCI state provided by DLorJointT-CIState, and the second TCI state in the pair could be a separate DL TCI state provided by DLorJointTCIState, a separate UL TCI state provided by UL-TCIState or a joint DL and UL TCI state provided by DLorJointTCIState. For instance, one TCI state in the pair could be for DL channels/ signals, and the other TCI state in the pair could be for UL channels/signals.

Yet for another example, a codepoint could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState. Furthermore, the first TCI state could be activated/selected by the MAC CE from the first (or second) TCI state pool or the first (or second) TCI state group, and the second TCI state could be activated/selected by the MAC CE from the second (or first) TCI state pool or the second (or first) TCI state group.

Yet for another example, a codepoint could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState. Furthermore, the first (or second) TCI state could be associated with the entity ID associated with the serving cell PCI/PCI index or the lowest entity ID or the first entity ID in the higher layer configured list of entity IDs, and the second (or first) TCI state could be associated with the entity ID associated with a PCI/PCI index other than the serving cell PCI/PCI index or the highest entity ID value or the last entity ID value in the higher layer configured list of entity IDs.

Alternatively, the first (or second) TCI state could be associated with the serving cell PCI/PCI index or the lowest PCI value or the first PCI value in the higher layer config- ured list of PCIs or the lowest PCI index or the first PCI index in the set of PCI indexes or the PCI index pointing to the lowest PCI value in the higher layer configured list of PCIs, and the second (or first) TCI state could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState. Furthermore, if the UE is provided in PDCCH-Config two values of CORESETPoolIndex (i.e., 0 and 1), the first (or second) TCI state could be associated with value 0 of CORESETPoolIndex or CORESETPoolIndex value associ- ated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with value 1 of CORESETPoolIndex or CORESETPoolIndex value asso- ciated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/ signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState.

For instance, one TCI state in the second pair could be for DL channels/signals, and the other TCI state in the second pair could be for UL channels/signals. Furthermore, the first and second TCI states in the first pair could be activated/ selected by the MAC CE from the first (or second) TCI state pool or the first (or second) TCI state group, and the first and second TCI states in the second pair could be activated/ selected by the MAC CE from the second (or first) TCI state pool or the second (or first) TCI state group.

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState.

For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState.

For instance, one TCI state in the second pair could be for DL channels/signals, and the other TCI state in the second pair could be for UL channels/signals. Furthermore, the first and second TCI states in the first (or second) pair could be associated with the entity ID associated with the serving cell PCI/PCI index or the lowest entity ID value or the first entity ID value in the higher layer configured list of entity IDs, and the first and second TCI states in the second (or first) pair could be associated with the entity ID associated with a PCI/PCI index other than the serving cell PCI/PCI index or the highest entity ID value or the last entity ID value in the higher layer configured list of entity IDs.

Alternatively, the first and second TCI states in the first (or second) pair could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals.

Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals.

Furthermore, if the UE is provided in PDCCH-Config two values of CORESETPoolIndex (i.e., 0 and 1), the first and second TCI states in the first (or second) pair could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

As aforementioned, one or more of the $Nc \geq 1$ (e.g., 8, 16, 32 or 64) TCI state codepoints activated by the MAC CE could correspond to the TCI state codepoints in the present disclosure. Furthermore, a "transmission configuration indication (TCI)" field in DCI format 1_1 or 1_2 with or without DL assignment could indicate a TCI state codepoint from the $Nc \geq 1$ (e.g., 8, 16, 32 or 64) activated TCI state codepoints discussed in the present disclosure.

Optionally, the UE could receive from the network an auxiliary MAC CE subselection/activation command selecting/activating one or more ($Nc' \geq 1$, e.g., $Nc'=8$, 16, 32 or 64) TCI state codepoints from the set of Nc activated TCI state codepoints as a subset of Nc' TCI state codepoints. For this case, the "transmission configuration indication" (TCI) field in DCI format 1_1 or 1_2 with or without DL assignment could indicate a TCI state codepoint from the subset of $Nc' \geq 1$ (e.g., 8, 16, 32 or 64) TCI state codepoints.

Additionally, if the beam indication DCI, e.g., DCI format 1_1 or 1_2, is with DL assignment or the beam indication DCI, e.g., DCI format 1_1 or 1_2, is without DL assignment or the number of TCI state codepoints Nc (to be) activated by the MAC CE is smaller/lower (or larger/greater) than a threshold or the UE is explicitly indicated/configured/provided by the network, e.g. via higher layer RRC signaling and/or MAC CE command and/or dynamic DCI based L1 signaling that, the TCI state codepoint indicated in the "transmission configuration indication" field could only correspond to/indicate a single TCI state or a single pair of TCI states (e.g., the TCI state codepoint) for single-TRP operation—for instance, here, the single TCI state could be a joint or DL or UL TCI state, while the single pair of TCI states could correspond to a pair of DL and UL TCI states; otherwise, the TCI state codepoint indicated in the TCI field could correspond to/indicate M/N>1 TCI states or M/N>1 pairs of TCI states (e.g., the TCI state codepoint) for multi-TRP operation.

Or equivalently, if the beam indication DCI, e.g., DCI format 1_1 or 1_2, is with DL assignment or the beam indication DCI, e.g., DCI format 1_1 or 1_2, is without DL assignment or the number of TCI state codepoints Nc (to be) activated by MAC CE is smaller/lower (or larger/greater) than a threshold or the UE is explicitly indicated/configured/provided by the network, e.g. via higher layer RRC signaling and/or MAC CE command and/or dynamic DCI based L1 signaling that, each (or one or more) of the MAC CE activated TCI state codepoints could only correspond to/indicate a single TCI state or a single pair of TCI states (e.g., the TCI state codepoint) for single-TRP operation—for instance, here, the single TCI state could be a joint or DL or UL TCI state, while the single pair of TCI states could correspond to a pair of DL and UL TCI states; otherwise, each (or one or more) of the MAC CE activated TCI state codepoints could only correspond to/indicate M/N>1 TCI states or M/N>1 pairs of TCI states (e.g., the TCI state codepoint for multi-TRP operation. In the present disclosure, the threshold could be (1) fixed, e.g., 8, 16, 32 or 64, or (2) configured by the network via higher layer RRC signaling or/and MAC CE command or/and DCI based signaling.

Optionally, when the beam indication DCI, e.g., DCI format 1_1 or 1_2, is with DL assignment or the UE is configured by the network (e.g., via higher layer RRC signaling and/or MAC CE command and/or dynamic DCI based signaling) that the MTRP operation is enabled (e.g., a higher layer parameter denoted by "MTRPoperation," e.g., provided in PDCCH-Config/PDSCH-Config/ServingCell-Config and etc. is configured or set to "enabled"/"on") or the UE is configured by the network (e.g., via higher layer RRC signaling and/or MAC CE command and/or dynamic DCI based signaling) that the unified TCI state type for this serving cell is "joint" (e.g., a higher layer parameter denoted by unifiedTCI-StateType, e.g., provided in PDCCH-Config/PDSCH-Config/ServingCellConfig is configured and set to "joint") or the UE is provided in PDSCH-Config/PDCCH-Config/ControlResourceSet two values of CORESET-PoolIndex (0 and 1) or CORESETGroupIndex (0 and 1) for multi-DCI and single-DCI based MTRP operations respectively or the UE receives from the network a unified TCI state activation MAC CE with an entity ID provided/configured therein (where the entity ID could correspond to CORESETPoolIndex, CORESETGroupIndex, a one-bit flag, a PCI, a PCI index and etc.) or the UE is explicitly indicated/configured/provided by the network, e.g. via higher layer RRC signaling and/or MAC CE command and/or dynamic DCI based L1 signaling that, the maximum number of TCI codepoints that can be activated by the MAC CE and mapped to a TCI field could be X1, while when the beam indication DCI, e.g., DCI format 1_1 or 1_2, is without DL assignment or the UE is configured by the network (e.g., via higher layer RRC signaling and/or MAC CE command and/or dynamic DCI based signaling) that the MTRP operation is not enabled/disabled (e.g., a higher layer parameter denoted by "MTRPoperation," e.g., provided in PDCCH-Config/PDSCH-Config/ServingCellConfig and etc. is not configured or set to "disabled"/"off") or the UE is configured by the network (e.g., via higher layer RRC signaling and/or MAC CE command and/or dynamic DCI based signaling) that the unified TCI state type for this serving cell is "separate" (e.g., a higher layer parameter denoted by unifiedTCI-StateType, e.g., provided in PDCCH-Config/PDSCH-Config/ServingCellConfig is configured and set to "separate") or the UE is not provided in PDSCH-Config/PDCCH-Config/ControlResourceSet two values of CORESETPoolIndex (0 and 1) or is provided in PDSCH-Config/PDCCH-Config/ControlResourceSet a single value of CORESETPoolIndex (e.g., 0) or the UE is not provided in PDSCH-Config/PDCCH-Config/Control-ResourceSet two values of CORESETGroupIndex (0 and 1) or is provided in PDSCH-Config/PDCCH-Config/Control-ResourceSet a single value of CORESETGroupIndex (e.g., 0) or the UE receives from the network a unified TCI state activation MAC CE with no entity ID(s) provided/configured therein (where an entity ID could correspond to CORESETPoolIndex, CORESETGroupIndex, a one-bit flag, a PCI, a PCI index and etc.) or the UE is explicitly indicated/configured/provided by the network, e.g. via higher layer RRC signaling and/or MAC CE command and/or dynamic DCI based L1 signaling that, the maximum number of TCI codepoints that can be activated by the MAC CE and mapped to a TCI field could be X2. Here, (1) X1=X2, e.g., X1=X2=8 (the corresponding maximum number of TCI field bits is 3) or X1=X2=16 (the corresponding maximum number of TCI field bits is 4), (2) X1>X2, e.g., X1=16 (the corresponding maximum number of TCI field bits is 4) and X2=8 (the corresponding maximum number of TCI field bits is 3), or (3) X1<X2, e.g., X1=8 (the corresponding maximum number of TCI field bits is 3) and X2=16 (the corresponding maximum number of TCI field bits is 4). In the present disclosure, the values of X1 and/or X2 could be determined based on a rule such as (i) fixed in the system specification(s), or (ii) configured/indicated/provided to the UE by the network, e.g., via higher layer RRC signaling and/or MAC CE command and/or dynamic DCI based L1 signaling.

Figures 9, 10:
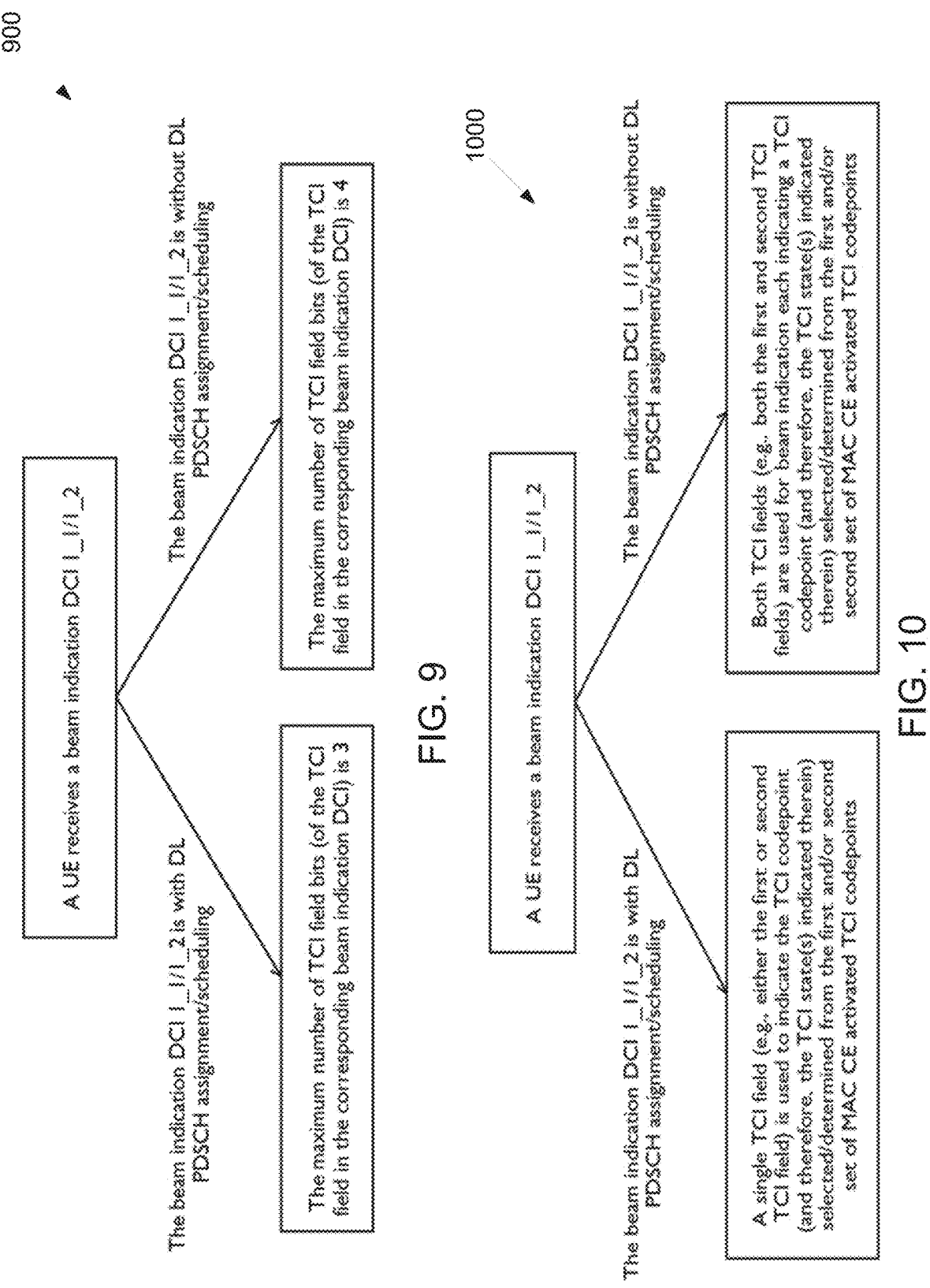
FIG. 9 illustrates an example of determination for a maximum number of TCI field bits according to embodiments of the present disclosure.
FIG. 10 illustrates an example of signaling the TCI state(s) in a beam indication DCI according to embodiments of the present disclosure.

FIG. 9 illustrates an example of a determination method 900 for a maximum number of TCI field bits according to embodiments of the present disclosure. The determination method 900 as may be performed by a UE (e.g., 111-116 as illustrated in FIG. 1). An embodiment of the determination method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In FIG. 9, a conceptual example of the above described method of determining the maximum number of TCI field bits is presented. As depicted in FIG. 9, when the received beam indication DCI (e.g., DCI format 1_1 or 1_2) is with DL assignment, the maximum number of TCI field bits (of the TCI field in the beam indication DCI) is 3—e.g., used to indicate a total of 8 activated TCI codepoints or the first (or last) 8 TCI codepoints out of a total of 16 activated TCI codepoints. When the received beam indication DCI (e.g., DCI format 1_1 or 1_2) is without DL assignment, the maximum number of TCI field bits (of the TCI field in the beam indication DCI) is 4—e.g., used to indicate a total of 16 activated TCI codepoints.

In another example, for M=2 (or N=2), the UE could receive from the network a MAC CE subselection/activation command activating two sets of TCI state codepoints mapped to one or more TCI fields in one or more DCIs (e.g., format 1_1 or 1_2 with or without DL assignment). For this case, the first set could contain (up to) $Nc1 \geq 1$ (e.g., 8, 16, 32 or 64) TCI state codepoints, and the second set could contain (up to) $Nc2 \geq 1$ (e.g., 8, 16, 32 or 64) TCI state codepoints. The first set of TCI state codepoints or the second set of TCI state codepoints could contain or correspond to or be associated with/to an entity ID. Here, the entity ID could correspond to at least one of: a one-bit indicator/set index with "0" (or "1") indicating the first set of TCI state codepoints and "1" (or "0") indicating the second set of TCI state codepoints, a PCI value, a PCI index pointing to an entry/PCI in a list of PCI that are higher layer configured to the UE, a value of CORESETPoolIndex, a value of CORE-SETGroupIndex, a TRP ID, a TRP-specific higher layer signaling index, a CORESET ID, a resource ID/index, a resource set ID/index and etc.

In another example, for M=2 (or N=2), the UE could receive from the network a first MAC CE subselection/activation command activating a first set of (up to) $Nc1 \geq 1$ (e.g., 8, 16, 32 or 64) TCI state codepoints mapped to one or more TCI fields in one or more DCIs (e.g., format 1_1 or 1_2 with or without DL assignment), and a second MAC CE subselection/activation command activating a second set of $Nc2 \geq 1$ (e.g., 8, 16, 32 or 64) TCI state codepoints mapped to one or more TCI fields in one or more DCIs (e.g., format 1_1 or 1_2 with or without DL assignment). The first MAC CE subselection/activation command or the second MAC CE subselection/activation command could contain or correspond to or be associated to/with an entity ID. Here, the entity ID could correspond to at least one of: a one-bit indicator/MAC CE command index with "0" (or "1") indicating the first MAC CE activation command and "1" (or "0") indicating the second MAC CE activation command, a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc.

In another example, for M=2 (or N=2), the UE could receive from the network a MAC CE subselection/activation command activating a superset of Mc≥1 (e.g., 8, 16, 32 or 64) TCI state codepoints mapped to one or more TCI fields in one or more DCIs (e.g., format 1_1 or 1_2 with or without DL assignment). The superset of Mc TCI state codepoints can be partitioned/divided into a first set of $N_c1\geq1$ (e.g., 8, 16, 32 or 64) TCI state codepoints mapped to one or more TCI fields in one or more DCIs (e.g., format 1_1 or 1_2 with or without DL assignment), and a second set of Nc2≥1 (e.g., 8, 16, 32 or 64) TCI state codepoints mapped to one or more TCI fields in one or more DCIs (e.g., format 1_1 or 1_2 with or without DL assignment), with Mc=Nc1+Nc2. The UE could be indicated by the network the values of Nc1 or Nc2 via higher layer RRC signaling or MAC CE command or dynamic DCI based signaling. For instance, for Mc=16, the first set of Nc1=8 TCI codepoints could correspond to the first (or last) 8 of TCI codepoints in the superset of Mc=16 TCI codepoints described herein, and the second set of Nc2=8 TCI codepoints could correspond to the last (or first) 8 of TCI codepoints in the superset of Mc=16 TCI codepoints described herein.

A codepoint in the first or second set of TCI state codepoints could be determined according to one or more of the following examples.

For example, a codepoint in the first set of codepoints or the second set of codepoints could correspond to a TCI state, wherein the TCI state could be a separate DL TCI state provided by DLorJointTCIState, a separate UL TCI state provided by UL-TCIState, or a joint DL and UL TCI state provided by DLorJointTCIState.

For another example, a codepoint in the first set of codepoints or the second set of codepoints could correspond to a pair of two TCI states, wherein the first TCI state in the pair could be a separate DL TCI state provided by DLorJointTCIState, a separate UL TCI state provided by UL-TCIState or a joint DL and UL TCI state provided by DLorJointTCIState, and the second TCI state in the pair could be a separate DL TCI state provided by DLorJointTCIState, a separate UL TCI state provided by UL-TCIState or a joint DL and UL TCI state provided by DLorJointTCIState. For instance, one TCI state in the pair could be for DL channels/signals, and the other TCI state in the pair could be for UL channels/signals.

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState. Furthermore, the first TCI state could be activated/selected by the corresponding MAC CE from the first (or second) TCI state pool or the first (or second) TCI state group, and the second TCI state could be activated/selected by the corresponding MAC CE from the second (or first) TCI state pool or the second (or first) TCI state group.

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState.

Furthermore, the first (or second) TCI state could be associated with the entity ID associated with the serving cell PCI/PCI index or the lowest entity ID or the first entity ID in the higher layer configured list of entity IDs, and the second (or first) TCI state could be associated with the entity ID associated with a PCI/PCI index other than the serving cell PCI/PCI index or the highest entity ID value or the last entity ID value in the higher layer configured list of entity IDs.

Alternatively, the first (or second) TCI state could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState, or a joint DL and UL TCI state provided by DLorJointTCIState, and the second TCI state could be a separate DL TCI state provided by DLorJointTCIState, a separate UL TCI state provided by UL-TCIState, or a joint DL and UL TCI state provided by DLorJointTCIState.

Furthermore, if the UE is provided in PDCCH-Config two values of CORESETPoolIndex (i.e., 0 and 1), the first (or second) TCI state could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals.

Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals.

Furthermore, the first and second TCI states in the first pair could be activated/selected by the corresponding MAC CE from the first (or second) TCI state pool or the first (or second) TCI state group, and the first and second TCI states in the second pair could be activated/selected by the corresponding MAC CE from the second (or first) TCI state pool or the second (or first) TCI state group.

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals.

Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals.

Furthermore, the first and second TCI states in the first (or second) pair could be associated with the entity ID associated with the serving cell PCI/PCI index or the lowest entity ID value or the first entity ID value in the higher layer configured list of entity IDs, and the first and second TCI states in the second (or first) pair could be associated with the entity ID associated with a PCI/PCI index other than the serving cell PCI/PCI index or the highest entity ID value or the last entity ID value in the higher layer configured list of entity IDs.

Alternatively, the first and second TCI states in the first (or second) pair could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals.

Furthermore, if the UE is provided in PDCCH-Config two values of CORESETPoolIndex (i.e., 0 and 1), the first and second TCI states in the first (or second) pair could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState.

Furthermore, the first TCI state could be activated/selected by the MAC CE from the first (or second) TCI state pool or the first (or second) TCI state group. In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals.

Furthermore, the first and second TCI states in the first pair could be activated/selected by the MAC CE from the first (or second) TCI state pool or the first (or second) TCI state group.

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState.

Furthermore, the first TCI state could be associated with the entity ID associated with the serving cell PCI/PCI index or the lowest entity ID or the first entity ID in the higher layer configured list of entity IDs or the entity ID associated with a PCI/PCI index other than the serving cell PCI/PCI index or the highest entity ID value or the last entity ID value in the higher layer configured list of entity IDs.

Alternatively, the first TCI state could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs or a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs. In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState.

For instance, one TCI state in the first pair could be for DL channels/signals, and the other TCI state in the first pair could be for UL channels/signals. Furthermore, the first and second TCI states in the first pair could be associated with the entity ID associated with the serving cell PCI/PCI index or the lowest entity ID value or the first entity ID value in the higher layer configured list of entity IDs or the entity ID associated with a PCI/PCI index other than the serving cell PCI/PCI index or the highest entity ID value or the last entity ID value in the higher layer configured list of entity IDs.

Alternatively, the first and second TCI states in the first pair could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs or a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState.

Furthermore, if the UE is provided in PDCCH-Config two values of CORESETPoolIndex (i.e., 0 and 1), the first TCI state could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs or value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals.

Furthermore, if the UE is provided in PDCCH-Config two values of CORESETPoolIndex (i.e., 0 and 1), the first and second TCI states in the first pair could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs or value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

According to the above discussions/descriptions, (1) each of the one or more TCI state codepoints in the first or second sets of TCI state codepoints could correspond to $M=2$ or $N=2$ (joint DL and UL or DL-only or UL-only) TCI states, (2) each of the one or more TCI state codepoints in the first or second sets of TCI state codepoints could correspond to $M=2$ (or $N=2$) pairs of two (separate DL and UL) TCI states, or (3) each of the one or more TCI state codepoints in the first or second sets of TCI state codepoints could correspond to a (joint DL and UL or DL-only or UL-only) TCI state and a pair of two (separate DL and UL) TCI states.

In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, the TCI states indicated by the first set of TCI state codepoints could be activated/selected by the MAC CE from the first (or second) TCI state pool or the first (or second) TCI state group, and the TCI states indicated by the second set of TCI state codepoints could be activated/selected by the MAC CE from the second (or first) TCI state pool or the second (or first) TCI state group.

For another example, the TCI states indicated by the first (or second) set of TCI state codepoints could be associated with the entity ID associated with the serving cell PCI/PCI index or the lowest entity ID value or the first entity ID value in the higher layer configured list of entity IDs, and the TCI states indicated by the second (or first) set of TCI state codepoints could be associated with the entity ID associated with a PCI/PCI index other than the serving cell PCI/PCI index or the highest entity ID value or the last entity ID value in the higher layer configured list of entity IDs.

Alternatively, the TCI states indicated by the first (or second) set of TCI state codepoints could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the TCI states indicated by the second (or first) set of TCI state codepoints could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1), the TCI states indicated by the first (or second) set of TCI state codepoints could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the TCI states indicated by the second (or first) set of TCI state codepoints could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, the first MAC CE subselection/activation command could include/indicate a first entity ID, and the second MAC CE subselection/activation command could include/indicate a second entity ID. In the present disclosure, the first entity ID or the second entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. For this case, the TCI states indicated by the first set of TCI state codepoints activated/selected by the first MAC CE subselection/activation command could be associated with the first entity ID, and the TCI states indicated by the second set of TCI state codepoints activated/selected by the second MAC CE subselection/activation command could be associated with the second entity ID.

For DCI based beam indication, DCI format 1_1 with or without DL assignment or DCI format 1_2 with or without DL assignment could indicate/include a first "transmission configuration indication" (TCI) field (or denoted by a first TCI field or TCI field 1) indicating a first TCI state codepoint, and a second "transmission configuration indication" field (denoted by a second TCI field or TCI field 2) indicating a second TCI state codepoint. In one example, the first TCI field or the second TCI field could be a new and dedicated TCI field added/configured/provided/indicated in the DCI format 1_1 or 1_2 (with or without DL assignment), which is different from the existing DCI fields configured therein.

In another example, the first TCI field or the second TCI field could correspond to the existing "transmission configuration indication" (TCI) field in the DCI format 1_1 or 1_2 (with or without DL assignment). In yet another example, the first TCI field or the second TCI field could be configured/indicated/provided by repurposing one or more bits of one or more of the existing DCI fields in the DCI format 1_1 or 1_2 (with or without DL assignment). In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, the TCI state(s) indicated by the first TCI state codepoint/the first TCI field could be activated/selected by the MAC CE from the first (or second) TCI state pool or the first (or second) TCI state group, and the TCI state(s) indicated by the second TCI state codepoint/the second TCI field could be activated/selected by the MAC CE from the second (or first) TCI state pool or the second (or first) TCI state group.

For another example, the first (or second) TCI state codepoint/the first (or second) TCI field could be associated with the entity ID associated with the serving cell PCI/PCI index or the lowest entity ID value or the first entity ID value in the higher layer configured list of entity IDs, and the second (or first) TCI state codepoint/the second (or first) TCI field could be associated with the entity ID associated with a PCI/PCI index other than the serving cell PCI/PCI index or the highest entity ID value or the last entity ID value in the higher layer configured list of entity IDs.

Alternatively, the first (or second) TCI state codepoint/the first (or second) TCI field could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state codepoint/the second (or first) TCI field could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1), the first (or second) TCI state codepoint/the first (or second) TCI field could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state codepoint/the second (or first) TCI field could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In one example, the first TCI field could indicate the first TCI state codepoint from the first set of TCI state codepoints, and the second TCI field could indicate the second TCI state codepoint from the second set of TCI state codepoints. Alternatively, the first TCI field could indicate the first TCI state codepoint from the first set of TCI state codepoints, and the second TCI field could indicate the second TCI state codepoint from the first set of TCI state codepoints.

In another example, the first TCI field could indicate the first TCI state codepoint from the second set of TCI state codepoints, and the second TCI field could indicate the second TCI state codepoint from the first set of TCI state codepoints. Alternatively, the first TCI field could indicate the first TCI state codepoint from the second set of TCI state codepoints, and the second TCI field could indicate the second TCI state codepoint from the second set of TCI state codepoints.

In yet another example, the UE could receive a first one-bit flag for the first TCI field with "0" indicating that the first TCI state codepoint is indicated from the first (or second) set of TCI state codepoints and "1" indicating that the first TCI state codepoint is indicated from the second (or first) set of TCI state codepoints; furthermore, the UE could receive a second one-bit flag for the second TCI field with "0" indicating that the second TCI state codepoint is indicated from the first (or second) set of TCI state codepoints and "1" indicating that the second TCI state codepoint is indicated from the second (or first) set of TCI state codepoints. The UE could be configured by the network via higher layer RRC signaling or MAC CE command or DCI based signaling the first or second one-bit flag indicators.

If the beam indication DCI, e.g., DCI format 1_1 or 1_2, is with DL assignment or the beam indication DCI, e.g., DCI format 1_1 or 1_2, is without DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is explicitly indicated/configured/provided by the network, e.g., via higher layer RRC signaling and/or MAC CE command and/or dynamic DCI based L1 signaling that, the beam indication DCI, e.g., DCI format 1_1 or 1_2, could only indicate/configure/provide a single TCI field (e.g., either the first or the second TCI field as described above) to indicate/update one or more TCI states—i.e., only a single TCI field (e.g., either the first or the second TCI field as described above) could be present/configured/indicated/provided in the beam indication DCI, e.g., DCI format 1_1 or 1_2, to indicate/update the TCI state(s); otherwise, beam indication DCI, e.g., DCI format 1_1 or 1_2, could indicate/configure/provide both TCI fields (i.e., the first and second TCI fields as described above) to indicate/update one or more TCI states—i.e., both TCI fields (i.e., the first and second TCI fields as described above) could be present/configured/indicated/provided in the beam indication DCI, e.g., DCI format 1_1 or 1_2, to indicate/update the TCI state(s). Optionally, if the beam indication DCI, e.g., DCI format 1_1 or 1_2, is with DL assignment or the beam indication DCI, e.g., DCI format 1_1 or 1_2, is without DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is explicitly indicated/configured/provided by the network, e.g., via higher layer RRC signaling and/or MAC CE command and/or dynamic DCI based L1 signaling that, the beam indication DCI, e.g., DCI format 1_1 or 1_2, could only indicate/configure/provide a single TCI field (e.g., either the first or the second TCI field as described above)—i.e., only a single TCI field (e.g., either the first or the second TCI field as described above) could be present/configured/indicated/provided in the beam indication DCI, e.g., DCI format 1_1 or 1_2, and the TCI state codepoint (e.g., either the first or the second TCI state codepoint as described above, e.g., selected from either the first set or the second set of TCI state codepoints) indicated in the TCI field could only correspond to/indicate a single TCI state or a single pair of TCI states for single-TRP operation—for instance, here, the single TCI state could be a joint or DL or UL TCI state, while the single pair of TCI states could correspond to a pair of DL and UL TCI states; otherwise, the beam indication DCI, e.g., DCI format 1_1 or 1_2, could only indicate/configure/provide a single TCI field (e.g., either the first or the second TCI field as described above)—i.e., only a single TCI field (e.g., either the first or the second TCI field as described above) could be present/configured/indicated/provided in the beam indication DCI, e.g., DCI format 1_1 or 1_2, and the TCI state codepoint (e.g., either the first or the second TCI state codepoint as described above, e.g., selected from either the first set or the second set of TCI state codepoints) indicated in the TCI field could correspond to/indicate M/N>1 TCI states or M/N>1 pairs of TCI states for multi-TRP operation. Or, if the beam indication DCI, e.g., DCI format 1_1 or 1_2, is with DL assignment or the beam indication DCI, e.g., DCI format 1_1 or 1_2, is without DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is explicitly indicated/configured/provided by the network, e.g., via higher layer RRC signaling and/or MAC CE command and/or dynamic DCI based L1 signaling that, each (or one or more) of the MAC CE activated TCI state codepoints in the first set or the second set of TCI state codepoints could only correspond to/indicate a single TCI state or a single pair of TCI states for single-TRP operation—for instance, here, the single TCI state could be a joint or DL or UL TCI state, while the single pair of TCI states could correspond to a pair of DL and UL TCI states; otherwise, each (or one or more) of the MAC CE activated TCI state codepoints in the first set or the second set of TCI state codepoints could correspond to M/N>1 TCI states or M/N>1 pairs of TCI states for multi-TRP operation. In the present disclosure, the threshold could be (1) fixed, e.g., 8, 16, 32 or 64, or (2) configured by the network via higher layer RRC signaling or/and MAC CE command or/and DCI based signaling.

Furthermore, when the beam indication DCI, e.g., DCI format 1_1 or 1_2, is with DL assignment or the UE is explicitly indicated/configured/provided by the network, e.g. via higher layer RRC signaling and/or MAC CE command and/or dynamic DCI based L1 signaling that, the maximum number of TCI codepoints that can be activated by the MAC CE and mapped to the first TCI field could be X1, and the maximum number of TCI codepoints that can be activated by the MAC CE and mapped to the second TCI field could be X2; here, (1) X1=X2, e.g., X1=X2=8 (the corresponding maximum number of TCI field bits is 3) or X1=X2=16 (the corresponding maximum number of TCI field bits is 4), (2) X1>X2, e.g., X1=16 (the corresponding maximum number of TCI field bits is 4) and X2=8 (the corresponding maximum number of TCI field bits is 3), or (3) X1<X2, e.g., X1=8 (the corresponding maximum number of TCI field bits is 3) and X2=16 (the corresponding maximum number of TCI field bits is 4).

When the beam indication DCI, e.g., DCI format 1_1 or 1_2, is without DL assignment or the UE is explicitly indicated/configured/provided by the network, e.g. via higher layer RRC signaling and/or MAC CE command and/or dynamic DCI based L1 signaling that, the maximum number of TCI codepoints that can be activated by the MAC CE and mapped to the first TCI field could be Y1, and the maximum number of TCI codepoints that can be activated by the MAC CE and mapped to the second TCI field could be Y2; here, (1) Y1=Y2, e.g., Y1=Y2=8 (the corresponding maximum number of TCI field bits is 3) or Y1=Y2=16 (the corresponding maximum number of TCI field bits is 4), (2) Y1>Y2, e.g., Y1=16 (the corresponding maximum number of TCI field bits is 4) and Y2=8 (the corresponding maximum number of TCI field bits is 3), or (3) Y1<Y2, e.g., Y1=8 (the corresponding maximum number of TCI field bits is 3) and Y2=16 (the corresponding maximum number of TCI field bits is 4).

Moreover, the relationship between X1 and Y1 could be one of the following: (1) X1=Y1, e.g., X1=Y1=8 (the corresponding maximum number of TCI field bits is 3) or X1=Y1=16 (the corresponding maximum number of TCI field bits is 4), (2) X1>Y1, e.g., X1=16 (the corresponding maximum number of TCI field bits is 4) and Y1=8 (the corresponding maximum number of TCI field bits is 3), or (3) X1<Y1, e.g., X1=8 (the corresponding maximum number of TCI field bits is 3) and Y1=16 (the corresponding maximum number of TCI field bits is 4). The relationship between X2 and Y2 could be one of the following: (1) X2=Y2, e.g., X2=Y2=8 (the corresponding maximum number of TCI field bits is 3) or X2=Y2=16 (the corresponding maximum number of TCI field bits is 4), (2) X2>Y2, e.g., X2=16 (the corresponding maximum number of TCI field bits is 4) and Y2=8 (the corresponding maximum number of TCI field bits is 3), or (3) X2<Y2, e.g., X2=8 (the corresponding maximum number of TCI field bits is 3) and Y2=16 (the corresponding maximum number of TCI field bits is 4).

Furthermore, the relationship between X1 and Y2 could be one of the following: (1) X1=Y2, e.g., X1=Y2=8 (the corresponding maximum number of TCI field bits is 3) or X1=Y2=16 (the corresponding maximum number of TCI field bits is 4), (2) X1>Y2, e.g., X1=16 (the corresponding maximum number of TCI field bits is 4) and Y2=8 (the corresponding maximum number of TCI field bits is 3), or (3) X1<Y2, e.g., X1=8 (the corresponding maximum number of TCI field bits is 3) and Y2=16 (the corresponding maximum number of TCI field bits is 4).

The relationship between X2 and Y1 could be one of the following: (1) X2=Y1, e.g., X2=Y1=8 (the corresponding maximum number of TCI field bits is 3) or X2=Y1=16 (the corresponding maximum number of TCI field bits is 4), (2) X2>Y1, e.g., X2=16 (the corresponding maximum number of TCI field bits is 4) and Y1=8 (the corresponding maximum number of TCI field bits is 3), or (3) X2<Y1, e.g., X2=8 (the corresponding maximum number of TCI field bits is 3) and Y1=16 (the corresponding maximum number of TCI field bits is 4).

In the present disclosure, the values of X1 and/or X2 and/or Y1 and/or Y2 could be determined based on a rule such as (i) fixed in the system specification(s), or (ii) configured/indicated/provided to the UE by the network, e.g., via higher layer RRC signaling and/or MAC CE command and/or dynamic DCI based L1 signaling. According to the design examples specified herein in the present disclosure, the second TCI field could be configured/configurable by RRC (i.e., the second TCI field could be present or absent in the corresponding beam indication DCI—e.g., format 1_1/1_2 with or without DL assignment—via RRC configuration). If via the higher layer RRC configuration, the second TCI field as described herein in the present disclosure is not present/absent in the DCI, the second TCI field bit is 0.

Furthermore, one or more of the following conditions can be applied to determine (i) whether a single TCI field (e.g., the first or second TCI field) or both TCI fields (e.g., both the first and second TCI fields) can be used to indicated/update one or more TCI states as specified herein in the present disclosure, (ii) when a single TCI field is present in the beam indication DCI, whether the TCI field can provide/indicate a single TCI state/pair of TCI states or more than one TCI states/pairs of TCI states, (iii) whether a single TCI state/pair of TCI states or more than one TCI states/pairs of TCI states can be mapped to a MAC CE activated TCI codepoint, and (iv) the values of X1 and/or X2 and/or Y1 and/or Y2, as described herein in the present disclosure.

In one example of condition 1, whether or not the UE is configured by the network (e.g., via higher layer RRC signaling and/or MAC CE command and/or dynamic DCI based signaling) that the MTRP operation is enabled (e.g., a higher layer parameter denoted by "MTRPoperation," e.g., provided in PDCCH-Config/PDSCH-Config/ServingCell-Config and etc. could be configured or not configured or set to "enabled"/"on" or "disabled"/"off").

In one example of condition 2, whether the UE is configured by the network (e.g., via higher layer RRC signaling and/or MAC CE command and/or dynamic DCI based signaling) that the unified TCI state type for this serving cell is "joint" or "separate" (e.g., a higher layer parameter denoted by unifiedTCI-StateType, e.g., provided in PDCCH-Config/PDSCH-Config/ServingCellConfig is configured and set to "joint" or "separate").

In one example of condition 3, whether or not the UE is provided in PDSCH-Config/PDCCH-Config/ControlResourceSet two values of CORESETPoolIndex (0 and 1) or CORESETGroupIndex (0 and 1) for multi-DCI and single-DCI based MTRP operations respectively.

In one example of condition 4, whether or not the UE is provided in PDSCH-Config/PDCCH-Config/ControlResourceSet a single value of CORESETPoolIndex (e.g., 0) or CORESETGroupIndex (e.g., 0).

In one example of condition 5, whether or not the UE receives from the network a unified TCI state activation MAC CE with an entity ID provided/configured therein (where the entity ID could correspond to CORESETPoolIndex, CORESETGroupIndex, a one-bit flag, a PCI, a PCI index and etc.).

FIG. 10 illustrates an example of signaling the TCI state(s) in a beam indication DCI 1000 according to embodiments of the present disclosure. The signaling the TCI state(s) in a beam indication DCI 1000 as may be performed by a UE (e.g., 111-116 as illustrated in FIG. 1). An embodiment of the signaling the TCI state(s) in a beam indication DCI 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In FIG. 10, a conceptual example of the above described/discussed method of signaling the TCI state(s) in a beam indication DCI is provided. As depicted in FIG. 10, when the received beam indication DCI (e.g., DCI format 1_1/1_2) is with DL assignment, the TCI state(s) is indicated by a single TCI field (and therefore, by the corresponding TCI codepoint indicated therein, selected/determined from the first and/or second set of MAC CE activated TCI codepoints) in the beam indication DCI, wherein the TCI field could correspond to the first or second TCI field as discussed above. When the received beam indication DCI (e.g., DCI format 1_1/1_2) is without DL assignment, both TCI fields (e.g., both of the first and second TCI fields) could be used for beam indication with each TCI field indicating a TCI codepoint (and therefore, the corresponding TCI state(s) indicated therein) selected/determined from the first and/or second set of MAC CE activated TCI codepoints.

As discussed above, for DCI based beam indication (or beam indication DCI), DCI format 1_1 with or without DL assignment or DCI format 1_2 with or without DL assignment could indicate/include/configure/provide a single "transmission configuration indication" (TCI) field indicating a TCI codepoint selected/determined from the first set of TCI state codepoints or the second set of TCI state codepoints as described above. Furthermore, a (new) one-bit flag indicator could be indicated/added/configured/incorporated/provided in the beam indication DCI, e.g., DCI format 1_1 or 1_2 with or without DL assignment; the one-bit flag indicator could be used to indicate mapping/association between the TCI field (and therefore, the corresponding TCI codepoint indicated therein) and a TRP (and therefore, channel(s)/signal(s) such as PDCCH(s)/PDSCH(s)/PUCCH (s)/PUSCH(s)/SRS(s)/CSI-RS(s) corresponding/associated to the TRP) or between the TCI field (and therefore, the corresponding TCI state codepoint indicated therein) and a set of MAC CE activated TCI state codepoints (e.g., the first or second set of MAC CE activated TCI state codepoints as described above).

Alternatively, the UE could receive from the network, e.g., via higher layer RRC signaling/parameter and/or MAC CE command, the one-bit (flag) indicator. Optionally, one or more (field) bits of one or more of the existing DCI fields (e.g., in DCI format 1_1 or 1_2) could be used/repurposed to indicate the mapping/association between the TCI field (and therefore, the corresponding TCI codepoint indicated therein) and a TRP (and therefore, channel(s)/signal(s) such as PDCCH(s)/PDSCH(s)/PUCCH(s)/PUSCH(s)/SRS(s)/

CSI-RS(s) corresponding/associated to the TRP) or between the TCI field (and therefore, the corresponding TCI state codepoint indicated therein) and a (first or second) set of MAC CE activated TCI state codepoints.

For instance, a single (field) bit of an existing DCI field (e.g., in DCI format 1_1 or 1_2) could be used/repurposed as the one-bit (flag) indicator described above; optionally, an existing one-bit DCI field (e.g., in DCI format 1_1 or 1_2) could be used/repurposed as the one-bit (flag) indicator described above. For example, the new data indicator (NDI) field (a one-bit DCI field) in the DCI format 1_1 or 1_2 with or without DL assignment could be used/repurposed to indicate the mapping/association between the TCI field (and therefore, the corresponding TCI codepoint indicated therein) and a TRP (and therefore, channel(s)/signal(s) such as PDCCH(s)/PDSCH(s)/PUCCH(s)/PUSCH(s)/SRS(s)/CSI-RS(s) corresponding/associated to the TRP) or between the TCI field (and therefore, the corresponding TCI codepoint indicated therein) and a (first or second) set of MAC CE activated TCI state codepoints, and the NDI could be toggled with every new transmission.

Note that other existing DCI field(s) than the NDI field in the DCI format 1_1 or 1_2 with or without DL assignment could also be used/repurposed to indicate the mapping/association between the TCI field and a TRP or between the TCI field and a (first or second) set of MAC CE activated TCI state codepoints. In the present disclosure, the UE could be higher layer configured by the network a list of entity IDs or a list of PCIs or a set of PCI indexes with each PCI index pointing to an entry/PCI in the list of PCIs that are higher layer configured to the UE.

According to the above discussions, in the following design examples, a (the) one-bit flag indicator could correspond to a new one-bit flag indicator (e.g., in form of a new one-bit DCI field) introduced/added/configured/indicated/provided in the beam indication DCI (e.g., DCI format 1_1 or 1_2 with or without DL assignment) and/or RRC signaling/parameter and/or MAC CE command, a single field bit of an existing DCI field (e.g., in DCI format 1_1 or 1_2 with or without DL assignment) used/repurposed to indicate/provide/configure the mapping/association between the TCI field (and therefore, the corresponding TCI state codepoint indicated therein) and a TRP (and therefore, channel(s)/signal(s) such as PDCCH(s)/PDSCH(s)/PUCCH(s)/PUSCH (s)/SRS(s)/CSI-RS(s) corresponding/associated to the TRP) or between the TCI field (and therefore, the corresponding TCI codepoint indicated therein) and a (first or second) set of MAC CE activated TCI state codepoints, or an existing one-bit DCI field—such as the NDI field (e.g., in DCI format 1_1 or 1_2 with or without DL assignment)—used/repurposed to indicate/provide/configure the mapping/association between the TCI field (and therefore, the corresponding TCI state codepoint indicated therein) and a TRP (and therefore, channel(s)/signal(s) such as PDCCH(s)/PDSCH(s)/PUCCH (s)/PUSCH(s)/SRS(s)/CSI-RS(s) corresponding/associated to the TRP) or between the TCI field (and therefore, the corresponding TCI codepoint indicated therein) and a (first or second) set of MAC CE activated TCI state codepoints.

For example, if the one-bit flag indicator/NDI is set to "0" or the NDI is toggled, the TCI state(s) indicated by the TCI state codepoint/the TCI field could be activated/selected by the MAC CE from the first (or second) TCI state pool or the first (or second) TCI state group, and if the one-bit flag indicator/NDI is set to "1" or the NDI is not toggled, the TCI state(s) indicated by the TCI state codepoint/the TCI field could be activated/selected by the MAC CE from the second (or first) TCI state pool or the second (or first) TCI state group.

For another example, if the one-bit flag indicator/NDI is set to "0" (or "1") or the NDI is toggled (or is not toggled), the TCI state codepoint/the TCI field could be associated with the entity ID associated with the serving cell PCI/PCI index or the lowest entity ID value or the first entity ID value in the higher layer configured list of entity IDs, and if the one-bit flag indicator/NDI is set to "1" (or "0") or the NDI is not toggled (or is toggled), the TCI state codepoint/the TCI field could be associated with the entity ID associated with a PCI/PCI index other than the serving cell PCI/PCI index or the highest entity ID value or the last entity ID value in the higher layer configured list of entity IDs.

Alternatively, if the one-bit flag indicator/NDI is set to "0" (or "1") or the NDI is toggled (or is not toggled), the TCI state codepoint/the TCI field could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and if the one-bit flag indicator/NDI is set to "1" (or "0") or the NDI is not toggled (or is toggled), the TCI state codepoint/the TCI field could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1): if the one-bit flag indicator/NDI is set to "0" (or "1") or the NDI is toggled (or is not toggled), the TCI state codepoint/the TCI field could be associated with value 0 of CORE-SETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and if the one-bit flag indicator/NDI is set to "1" (or "0") or the NDI is not toggled (or is toggled), the TCI state codepoint/the TCI field could be associated with value 1 of CORESET-PoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, in a single-DCI based multi-TRP system, one or more CORESETs could be configured with a same group index, denoted by CORESETGroupIndex. The CORESETs configured with the same CORESETGroupIndex value could be associated with the same TRP in a multi-TRP system. In the present disclosure, the UE could be provided by PDCCH-Config multiple (e.g., two) CORE-SETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

For this case, if the UE is provided in PDCCH-Config two values of CORESETGroupIndex (i.e., 0 and 1): if the one-bit flag indicator/NDI is set to "0" (or "1") or the NDI is toggled (or is not toggled), the TCI state codepoint/the TCI field could be associated with value 0 of CORESETGroupIndex or CORESETGroupIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and if the one-bit flag indicator/NDI is set to "1" (or "0") or the NDI is not toggled (or is toggled), the TCI state codepoint/the TCI field could be associated with value 1 of CORESETGroupIndex or CORE-SETGroupIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, as discussed above, the one-bit flag indicator/NDI (e.g., in a beam indication DCI 1_1/1_2 with or without DL assignment) could be used to indicate the mapping/association between the TCI field/TCI state codepoint and a set of codepoints (e.g., the first or second set of TCI state codepoints). For this case, if the one-bit flag indicator/NDI is set to "0" (or "1") or the NDI is toggled (or is not toggled), the TCI state codepoint (and therefore, the corresponding TCI states indicated therein) indicated by the TCI field in the corresponding beam indication DCI could be selected/determined from the first set of TCI state code-points (e.g., among the two sets of MAC CE activated TCI codepoints described above in the present disclosure) or from both the first and second sets of TCI state codepoints, and if the one-bit flag indicator/NDI is set to "1" (or "0") or the NDI is not toggled (or is toggled), the TCI state code-point (and therefore, the corresponding TCI states indicated therein) indicated by the TCI field in the corresponding beam indication DCI could be selected/determined from the second set of TCI state codepoints (e.g., among the two sets of MAC CE activated TCI codepoints described above in the present disclosure) or from both the first and second sets of TCI state codepoints.

Yet for another example, the TCI field could indicate the TCI state codepoint from a third set of TCI state codepoints (or equivalently, the TCI state codepoint—and therefore, the corresponding TCI states indicated therein—indicated by the TCI field could be determined/selected from a third set of TCI state codepoints), wherein the third set of TCI state codepoints could comprise/contain/include/provide/config-ure/indicate one or more TCI state codepoints from the first set of TCI state codepoints and one or more TCI state codepoints from the second set of TCI state codepoints.

For instance, the first set of TCI state codepoints could comprise 8 TCI state codepoints, denoted by TCI_0, TCI_1, TCI_2, TCI_3, TCI_4, TCI_5, TCI_6 or TCL_7, and the second set of TCI state codepoints could comprise 8 TCI state codepoints, denoted by TCI_A, TCI_B, TCI_C, TCI_D, TCI_E, TCI_F, TCI_G or TCI_H. The third set of TCI state codepoints could then comprise TCI_0, TCI_1, TCI_2, TCI_3, TCI_A, TCI_B, TCI_C, TCI_D. The third set of TCI state codepoints could comprise any combinations of TCI state codepoints from the first and/or the second sets. The TCI state codepoints configured in the first and/or the second sets can be determined/selected into the third set according to a rule such as at least one of: (1) fixed in the system specifications or (2) configured by the network via higher layer RRC signaling, MAC CE command or dynamic DCI based L1 signaling.

Yet for another example, in a single-DCI based multi-TRP system, one or more CORESETs could be configured with a same group index, denoted by CORESETGroupIndex. The CORESETs configured with the same CORESETGroupIndex value could be associated with the same TRP in a multi-TRP system. In the present disclosure, the UE could be provided by PDCCH-Config multiple (e.g., two) CORE-SETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

For this design example, if the DCI for beam indication (e.g., DCI format 1_1 or 1_2 with or without downlink assignment) is received in a CORESET associated with value 0 (or 1) of CORESETGroupIndex, the TCI field could indicate the TCI state codepoint selected/determined from the first set of TCI state codepoints (or equivalently, the TCI state codepoint—and therefore, the corresponding TCI states indicated therein—indicated by the TCI field in the beam indication DCI could be determined/selected from the first set of TCI state codepoints) or from both the first and second sets of TCI state codepoints (or equivalently, the TCI state codepoint—and therefore, the corresponding TCI states indicated therein—indicated by the TCI field in the beam indication DCI could be determined/selected from both the first and second sets of TCI state codepoints); if the DCI for beam indication (e.g., DCI format 1_1 or 1_2 with or without downlink assignment) is received in a CORESET associated with value 1 (or 0) of CORESETGroupIndex, the TCI field could indicate the TCI state codepoint selected/determined from the second set of TCI state codepoints (or equivalently, the TCI state codepoint—and therefore, the corresponding TCI states indicated therein—indicated by the TCI field in the beam indication DCI could be determined/selected from the second set of TCI state codepoints) or from both the first and second sets of TCI state codepoints (or equivalently, the TCI state codepoint—and therefore, the corresponding TCI states indicated therein—indicated by the TCI field in the beam indication DCI could be determined/selected from both the first and second sets of TCI state codepoints).

Yet for another example, in a multi-DCI based multi-TRP system, one or more CORESETs could be configured with a same pool index, denoted by CORESETPoolIndex. The CORESETs configured with the same CORESETPoolIndex value could be associated with the same TRP (and therefore, signals/channels associated to the TRP) in a multi-TRP system. In the present disclosure, the UE could be provided by PDCCH-Config multiple (e.g., two) CORESETPoolIndex values (e.g., 0 and 1). The association of a CORESET and a CORESETPoolIndex value could be via indicating the explicit CORESETPoolIndex value (e.g., either 0 or 1) in the parameter, e.g., the higher layer parameter ControlResourceSet, configuring the CORESET.

For this design example, if the DCI for beam indication (e.g., DCI format 1_1 or 1_2 with or without downlink assignment) is received in a CORESET associated with value 0 (or 1) of CORESETPoolIndex, the TCI field could indicate the TCI state codepoint selected/determined from the first set of TCI state codepoints (or equivalently, the TCI state codepoint—and therefore, the corresponding TCI states indicated therein—indicated by the TCI field in the beam indication DCI could be determined/selected from the first set of TCI state codepoints) or from both the first and second sets of TCI state codepoints (or equivalently, the TCI state codepoint—and therefore, the corresponding TCI states indicated therein—indicated by the TCI field in the beam indication DCI could be determined/selected from both the first and second sets of TCI state codepoints); if the DCI for beam indication (e.g., DCI format 1_1 or 1_2 with or without downlink assignment) is received in a CORESET associated with value 1 (or 0) of CORESETPoolIndex, the TCI field could indicate the TCI state codepoint selected/determined from the second set of TCI state codepoints (or equivalently, the TCI state codepoint—and therefore, the corresponding TCI states indicated therein—indicated by the TCI field in the beam indication DCI could be determined/selected from the second set of TCI state codepoints) or from both the first and second sets of TCI state codepoints (or equivalently, the TCI state codepoint—and therefore, the corresponding TCI states indicated therein—indicated by the TCI field in the beam indication DCI could be determined/selected from both the first and second sets of TCI state codepoints).

Yet for another example, the one-bit flag indicator/NDI could be used as the most significant bit (MSB) and the TCI field bits (of the TCI field in the beam indication DCI 1_1/1_2 with or without DL assignment) could be used as the least significant bits (LSBs) to indicate a TCI codepoint from a set of MAC CE activated TCI codepoints (e.g., the first and/or second sets of MAC CE activated TCI codepoints as discussed above). For this case, if the one-bit flag indicator/NDI is set to "1" and the TCI field bits are "011," "1011" is used indicating the 12-th (or the 11-th) TCI codepoint (and therefore, the TCI states indicated therein) from the first and/or second sets of TCI codepoints.

Alternatively, the one-bit flag indicator/NDI could be used as the LSB and the TCI field bits (of the TCI field in the beam indication DCI 1_1/1_2 with or without DL assignment) could be used as the MSBs to indicate a TCI codepoint from a set of MAC CE activated TCI codepoints (e.g., the first and/or second sets of MAC CE activated TCI codepoints as discussed above). For this case, if the one-bit flag indicator/NDI is set to "1" and the TCI field bits are "011," "0111" is used indicating the 8-th (or the 7-th) TCI codepoint (and therefore, the TCI states indicated therein) from the first and/or second sets of TCI codepoints. Note that other orderings/combinations of the one-bit flag indicator/NDI and the TCI field bits are possible to indicate a TCI codepoint from a set of MAC CE activated TCI codepoints (e.g., the first and/or second sets of MAC CE activated TCI codepoints as discussed above); the orderings/combinations could be determined according to a rule such as: (1) fixed in the system specifications, and (2) configured/indicated/provided by the network, e.g., via higher layer RRC signaling/parameter and/or MAC CE command and/or dynamic DCI based signaling.

If the beam indication DCI, e.g., DCI format 1_1 or 1_2, is with (or without) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is configured by the network (e.g., via higher layer RRC signaling and/or MAC CE command and/or dynamic DCI based signaling) that the MTRP operation is not enabled (or enabled)—e.g., a higher layer parameter denoted by "MTR-Poperation," e.g., provided in PDCCH-Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by unifiedTCI-StateType, e.g., provided in PDCCH-Config/PDSCH-Config/ServingCellConfig is configured and set to "joint" (or "separate") or the UE is provided in PDSCH-Config/PDCCH-Config/ControlResourceSet two values of CORESETPoolIndex (0 and 1) or the UE is not provided in PDSCH-Config/PDCCH-Config/ ControlResourceSet two values of CORESETPoolIndex (0 and 1) or the UE is provided in PDSCH-Config/PDCCH-Config/ControlResourceSet a single value of CORESET-PoolIndex (e.g., 0) or the UE is provided in PDSCH-Config/ PDCCH-Config/ControlResourceSet two values of CORESETGroupIndex (0 and 1) or the UE is not provided in PDSCH-Config/PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, only the (existing) TCI field (e.g., a 3-bit or 4-bit TCI field) in the beam indication DCI (e.g., DCI format $1\_1/1\_2$ with DL assignment) could be used to provide/configure/indicate the TCI state codepoint (and therefore, the TCI states indicated therein) determined/selected from the first and/or second sets of MAC CE activated TCI codepoints as discussed above—e.g., from the first (or last) 8 TCI codepoints of a total of 16 activated TCI codepoints (i.e., here, the one-bit flag indicator/NDI is not used for beam indication); otherwise, i.e., if the beam indication DCI, e.g., DCI format $1\_1$ or $1\_2$, is without (or with) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is larger/greater (or smaller/lower) than a threshold or the UE is configured by the network (e.g., via higher layer RRC signaling and/or MAC CE command and/or dynamic DCI based signaling) that the MTRP operation is enabled (or not enabled/disabled)—e.g., a higher layer parameter denoted by "MTRPoperation," e.g., provided in PDCCH-Config/PDSCH-Config/ServingCellConfig and etc. is configured (or not configured) or set to "enabled"/"on" (or "disabled"/"off") or the UE is configured by the network (e.g., via higher layer RRC signaling and/or MAC CE command and/or dynamic DCI based signaling) that the unified TCI state type for this serving cell is "separate" (or "joint")—e.g., a higher layer parameter denoted by unifiedTCI-StateType, e.g., provided in PDCCH-Config/ PDSCH-Config/ServingCellConfig is configured and set to "separate" (or "joint") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlResourceSet two values of CORESETGroupIndex (0 and 1) or the UE is not provided in PDSCH-Config/ PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, both the (existing) TCI field (e.g., a 3-bit or 4-bit TCI field) in the beam indication DCI (e.g., DCI format $1\_1/1\_2$ without DL assignment) and the one-bit flag indicator (e.g., via repurposing the existing DCI field bit(s) in the beam indication DCI $1\_1/1\_2$ without DL assignment)/NDI could be used to provide/configure/indicate the TCI state codepoint (and therefore, the TCI states indicated therein) determined/selected from the first and/or second sets of MAC CE activated TCI codepoints as discussed above—e.g., from a total of 16 activated TCI codepoints (i.e., here, the one-bit flag indicator/NDI is used for beam indication).

Optionally, if the beam indication DCI, e.g., DCI format $1\_1$ or $1\_2$, is with DL assignment or the beam indication DCI, e.g., DCI format $1\_1$ or $1\_2$, is without DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is configured by the network (e.g., via higher layer RRC signaling and/or MAC CE command and/or dynamic DCI based signaling) that the MTRP operation is not enabled (or enabled)—e.g., a higher layer parameter denoted by "MTRPoperation," e.g., provided in PDCCH-Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by unifiedTCI-StateType, e.g., provided in PDCCH-Config/ PDSCH-Config/ServingCellConfig is configured and set to "joint" (or "separate") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlResourceSet two values of CORESETGroupIndex (0 and 1) or the UE is not provided in PDSCH-Config/ PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORE-SETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, only the (existing) TCI field (e.g., a 3-bit or 4-bit TCI field) in the beam indication DCI could be used to provide/configure/indicate the TCI state codepoint (and therefore, the TCI states indicated therein) determined/selected from the first and/or second sets of MAC CE activated TCI codepoints as discussed above (i.e., here, the one-bit flag indicator/NDI is not used for beam indication), and the TCI state codepoint (e.g., either the first or second TCI state codepoint as described above, e.g., selected from either the first set or the second set of TCI state codepoints) indicated in the TCI field could only correspond to/indicate a single TCI state or a single pair of TCI states for single-TRP operation—for instance, here, the single TCI state could be a joint or DL or UL TCI state, while the single pair of TCI states could correspond to a pair of DL and UL TCI states; otherwise, only the (existing) TCI field (e.g., a 3-bit or 4-bit TCI field) in the beam indication DCI could be used to provide/configure/indicate the TCI state codepoint (and therefore, the TCI states indicated therein) determined/selected from the first and/or second sets of MAC CE activated TCI codepoints as discussed above (i.e., here, the one-bit flag indicator/NDI is not used for beam indication), and the TCI state codepoint (e.g., either the first or the second TCI state codepoint as described above, e.g., selected from either the first set or the second set of TCI state codepoints) indicated in the TCI field could correspond to/indicate M/N>1 TCI states or M/N>1 pairs of TCI states for multi-TRP operation. Or, if the beam indication DCI, e.g., DCI format 1_1 or 1_2, is with DL assignment or the beam indication DCI, e.g., DCI format 1_1 or 1_2, is without DL assignment or the number of TCI state code-points Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is configured by the network (e.g., via higher layer RRC signaling and/or MAC CE command and/or dynamic DCI based signaling) that the MTRP operation is not enabled (or enabled)—e.g., a higher layer parameter denoted by "MTR-Poperation," e.g., provided in PDCCH-Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by unifiedTCI-StateType, e.g., provided in PDCCH-Config/PDSCH-Config/ServingCellConfig is configured and set to "joint" (or "separate") or the UE is provided in PDSCH-Config/PDCCH-Config/ControlRe-sourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESET- PoolIndex (e.g., 0) or the UE is provided in PDSCH-Config/PDCCH-Config/ControlResourceSet two values of CORESETGroupIndex (0 and 1) or the UE is not provided in PDSCH-Config/PDCCH-Config/ControlResourceSet two values of CORESETGroupIndex (0 and 1) or the UE is provided in PDSCH-Config/PDCCH-Config/ControlRe-sourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, both the (existing) TCI field (e.g., a 3-bit or 4-bit TCI field) in the beam indication DCI (e.g., DCI format 1_1/1_2 without DL assignment) and the one-bit flag indicator (e.g., via repurposing the existing DCI field bit(s) in the beam indication DCI 1_1/1_2 without DL assignment)/NDI could be used to provide/configure/indicate the TCI state codepoint (and therefore, the TCI states indicated therein) determined/selected from the first and/or second sets of MAC CE activated TCI codepoints as discussed above (i.e., here, the one-bit flag indicator/NDI is used for beam indication, and the TCI state codepoint (e.g., either the first or second TCI state codepoint as described above, e.g., selected from either the first set or the second set of TCI state codepoints) indicated in the TCI field could only correspond to/indicate a single TCI state or a single pair of TCI states for single-TRP operation—for instance, here, the single TCI state could be a joint or DL or UL TCI state, while the single pair of TCI states could correspond to a pair of DL and UL TCI states; otherwise, both the (existing) TCI field (e.g., a 3-bit or 4-bit TCI field) in the beam indication DCI (e.g., DCI format 1_1/1_2 without DL assignment) and the one-bit flag indicator (e.g., via repurposing the existing DCI field bit(s) in the beam indication DCI 1_1/1_2 without DL assignment)/NDI could be used to provide/configure/indicate the TCI state codepoint (and therefore, the TCI states indicated therein) determined/selected from the first and/or second sets of MAC CE activated TCI codepoints as discussed above (i.e., here, the one-bit flag indicator/NDI is used for beam indication, and the TCI state codepoint (e.g., either the first or the second TCI state codepoint as described above, e.g., selected from either the first set or the second set of TCI state codepoints) indicated in the TCI field could correspond to/indicate M/N>1 TCI states or M/N>1 pairs of TCI states for multi-TRP operation. In the present disclosure, the threshold could be (1) fixed, e.g., 8, 16, 32 or 64, or (2) configured by the network via higher layer RRC signaling or/and MAC CE command or/and DCI based signaling.

Furthermore, the use of the one-bit flag indicator/NDI field for beam indication could be applied to DCI format 1_1 or 1_2 with or without DL assignment. Optionally, the use of the one-bit flag indicator/NDI field for beam indication could only be applied to DCI format 1_1 or 1_2 with DL assignment; for this case, for DCI format 1_1 or 1_2 without DL assignment, the one-bit flag indicator/NDI field could always be set to 0 or not present (e.g., via higher layer RRC signaling/configuration).

Or the use of the one-bit flag indicator/NDI field for beam indication could only be applied to DCI format 1_1 or 1_2 without DL assignment; for this case, for DCI format 1_1 or 1_2 with DL assignment, the one-bit flag indicator/NDI field could always be set to 0 or not present (e.g., via higher layer RRC signaling/configuration). In addition, the use of the one-bit flag indicator/NDI field for beam indication could be applied to other DCI formats (e.g., DCI format 0_1/0_2) than DCI format 1_1/1_2 (with or without DL assignment).

Figures 11, 12:
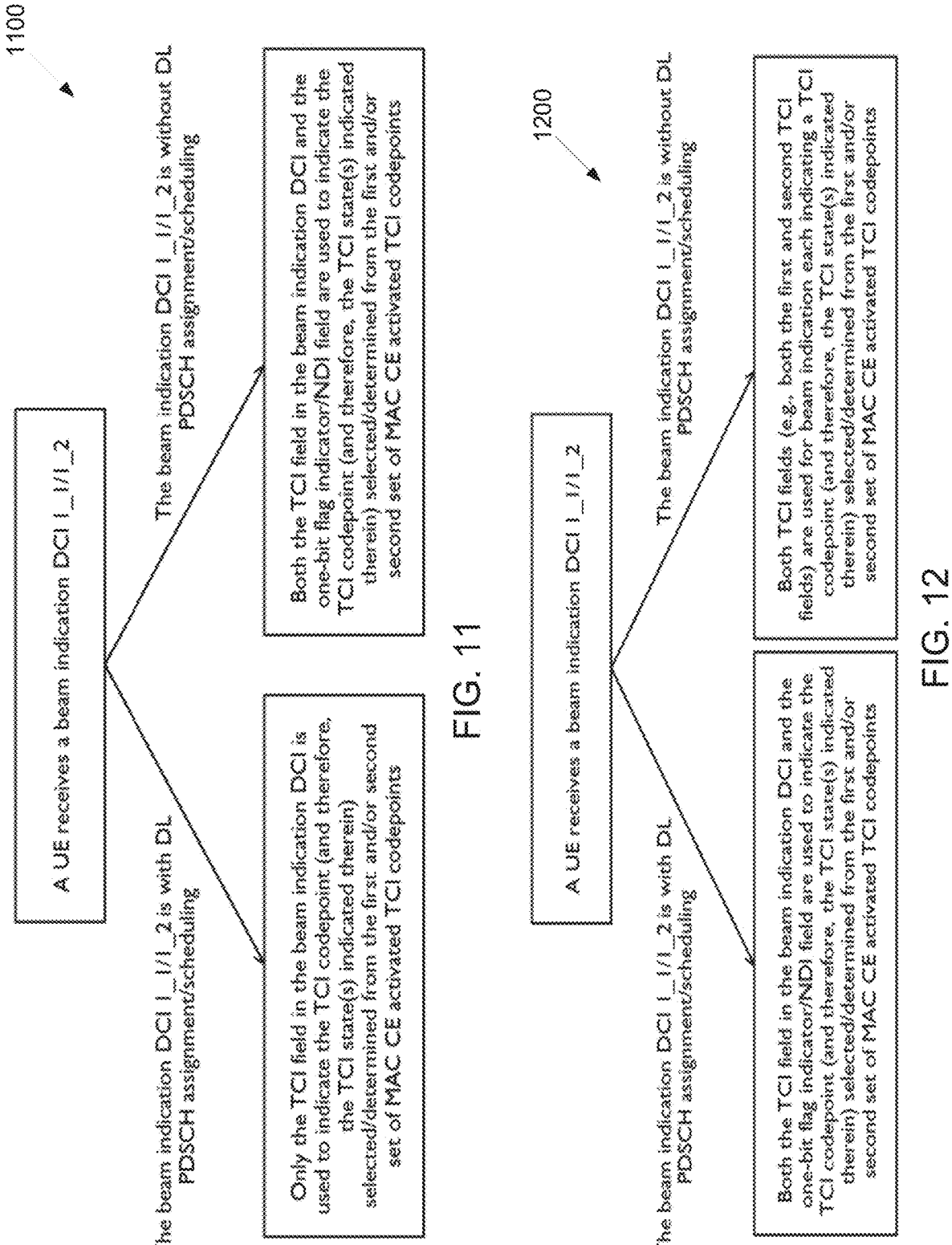
FIG. 11 illustrates another example of signaling the TCI state(s) in a beam indication DCI according to embodiments of the present disclosure.
FIG. 12 illustrates yet another example of signaling the TCI state(s) in a beam indication DCI according to embodiments of the present disclosure.

FIG. 11 illustrates another example of signaling the TCI state(s) in a beam indication DCI 1100 according to embodiments of the present disclosure. The signaling the TCI state(s) in a beam indication DCI 1100 as may be performed by a UE (e.g., 111-116 as illustrated in FIG. 1). An embodiment of the signaling the TCI state(s) in a beam indication DCI 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In FIG. 11, a conceptual example of the above described/discussed method of signaling the TCI state(s) in a beam indication DCI is provided. As depicted in FIG. 11, when the received beam indication DCI (e.g., DCI format 1_1/1_2) is with DL assignment, the TCI state(s) is indicated (only) by the (existing) TCI field (and therefore, by the corresponding TCI codepoint indicated therein, selected/determined from the first and/or second set of MAC CE activated TCI codepoints) in the beam indication DCI. When the received beam indication DCI (e.g., DCI format 1_1/1_2) is without DL assignment, both the TCI field in the beam indication DCI and the one-bit flag indicator/NDI field could be used to indicate the TCI codepoint (and therefore, the corresponding TCI state(s) indicated therein) selected/determined from the first and/or second set of MAC CE activated TCI codepoints.

According to the above discussions/descriptions, if the beam indication DCI, e.g., DCI format 1_1 or 1_2, is with (or without) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is configured by the network (e.g., via higher layer RRC signaling and/or MAC CE command and/or dynamic DCI based signaling) that the MTRP operation is not enabled (or enabled)—e.g., a higher layer parameter denoted by "MTRPoperation," e.g., provided in PDCCH-Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by unifiedTCI-StateType, e.g., provided in PDCCH-Config/PDSCH-Config/ServingCellConfig is configured and set to "joint" (or "separate") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlResourceSet two values of CORESETGroupIndex (0 and 1) or the UE is not provided in PDSCH-Config/PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, the beam indication DCI, e.g., DCI format 1_1 or 1_2, could indicate/configure/provide both TCI fields (i.e., the first and second TCI fields as described above) to indicate/update one or more TCI states—i.e., both TCI fields (i.e., the first and second TCI fields as described above) could be present/configured/indicated/provided in the beam indication DCI, e.g., DCI format 1_1 or 1_2, to indicate/update the TCI state(s); otherwise, i.e., if the beam indication DCI, e.g., DCI format 1_1 or 1_2, is without (or with) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is larger/greater (or smaller/lower) than a threshold or the UE is configured by the network (e.g., via higher layer RRC signaling and/or MAC CE command and/or dynamic DCI based signaling) that the MTRP operation is enabled (or not enabled/disabled)—e.g., a higher layer parameter denoted by "MTRPoperation," e.g., provided in PDCCH-Config/PDSCH-Config/ServingCellConfig and etc. is configured (or not configured) or set to "enabled"/"on" (or "disabled"/"off") or the UE is configured by the network (e.g., via higher layer RRC signaling and/or MAC CE command and/or dynamic DCI based signaling) that the unified TCI state type for this serving cell is "separate" (or "joint")—e.g., a higher layer parameter denoted by unifiedTCI-StateType, e.g., provided in PDCCH-Config/PDSCH-Config/ServingCellConfig is configured and set to "separate" (or "joint") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlResourceSet two values of CORESETGroupIndex (0 and 1) or the UE is not provided in PDSCH-Config/PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc. or the UE is explicitly indicated/configured/provided by the network, e.g., via higher layer RRC signaling and/or MAC CE command and/or dynamic DCI based L1 signaling that, a single TCI field (e.g., the first or second TCI field as described above) in the beam indication DCI and the one-bit flag indicator/NDI could be used together to provide/configure/indicate the TCI state codepoint (and therefore, the TCI states indicated therein) determined/selected from the first and/or second sets of MAC CE activated TCI codepoints as discussed above (i.e., here, the one-bit flag indicator/NDI is used for beam indication.

FIG. 12 illustrates yet another example of signaling the TCI state(s) in a beam indication DCI 1200 according to embodiments of the present disclosure. The signaling the TCI state(s) in a beam indication DCI 1200 as may be performed by a UE (e.g., 111-116 as illustrated in FIG. 1). An embodiment of the signaling the TCI state(s) in a beam indication DCI 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In FIG. 12, a conceptual example of the above described/ discussed method of signaling the TCI state(s) in a beam indication DCI is provided. As depicted in FIG. 12, when the received beam indication DCI (e.g., DCI format 1_1/1_2) is with DL assignment, both the TCI field in the beam indication DCI and the one-bit flag indicator/NDI field could be used to indicate the TCI codepoint (and therefore, the corresponding TCI state(s) indicated therein) selected/determined from the first and/or second set of MAC CE activated TCI codepoints. When the received beam indication DCI (e.g., DCI format 1_1/1_2) is without DL assignment, both TCI fields (e.g., both of the first and second TCI fields) could be used for beam indication with each TCI field indicating a TCI codepoint (and therefore, the corresponding TCI state(s) indicated therein) selected/determined from the first and/or second set of MAC CE activated TCI codepoints.

According to the design examples specified herein in the present disclosure, the presence of the one-bit indicator— e.g., in form of a new DCI indicator field or via repurposing the existing DCI field bit(s) in the corresponding DCI format following those specified in the present disclosure could be configured/configurable by RRC (i.e., the one-bit indicator specified herein in the present disclosure could be present— e.g., in form of a new DCI indicator field or via repurposing the existing DCI field bit(s)—or absent in the corresponding beam indication DCI—e.g., format 1_1/1_2 with or without DL assignment—via RRC configuration). If via the higher layer RRC configuration, the one-bit indicator as described herein in the present disclosure is not present/absent in the DCI, the number of bit for the one-bit indicator is 0 (e.g., when the one-bit indicator is in form of a new DCI indicator field).

As specified herein in the present disclosure, the one-bit (flag) indicator in the beam indication DCI (e.g., in form of a new DCI indicator field or via repurposing the existing DCI field bit(s) in the corresponding DCI format) can be used to indicate the association between the (existing) TCI field and a (first and/or second) set of MAC CE activated TCI codepoints, or to indicate the association between the (existing) TCI field and a TRP (e.g., the one-bit indicator could correspond to an entity ID, where the entity ID could be a value of CORESETPoolIndex, a value of CORESETGroupIndex, a RS set ID/index, a PCI, a PCI index and etc.).

For this case, the UE could be configured/provided/ informed/indicated by the network, e.g., via higher layer RRC signaling/parameter (e.g., by configuring/turning on a higher layer parameter denoted by "TCICodepointsAssociation" in PDCCH-Config/PDSCH-Config/ControlResource- Set/ServingCellConfig and etc. or by setting the higher layer parameter "TCICodepointsAssociation" to "enabled"/"on") and/or MAC CE command and/or dynamic DCI based L1 signaling, to use the one-bit (flag) indicator in the beam indication DCI (e.g., in form of a new DCI indicator field or via repurposing the existing DCI field bit(s) in the corresponding DCI format) to determine the association between the (existing) TCI field and a (first and/or second) set of MAC CE activated TCI codepoints.

Alternatively, the UE could be configured/provided/informed/indicated by the network, e.g., via higher layer RRC signaling/parameter (e.g., by configuring/turning on a higher layer parameter denoted by "TRPsAssociation" in PDCCH-Config/PDSCH-Config/ControlResourceSet/ServingCellConfig and etc. or by setting the higher layer parameter "TRPsAssociation" to "enabled"/"on") and/or MAC CE command and/or dynamic DCI based L1 signaling, to use the one-bit (flag) indicator in the beam indication DCI (e.g., in form of a new DCI indicator field or via repurposing the existing DCI field bit(s) in the corresponding DCI format) to determine the association between the (existing) TCI field and a TRP (e.g., the one-bit indicator could correspond to an entity ID, where the entity ID could be a value of CORESETPoolIndex, a value of CORESETGroupIndex, a RS set ID/index, a PCI, a PCI index and etc.).

Optionally, when/if the beam indication DCI, e.g., DCI format 1_1 or 1_2, is with (or without) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a threshold or the UE is configured by the network (e.g., via higher layer RRC signaling and/or MAC CE command and/or dynamic DCI based signaling) that the MTRP operation is not enabled (or enabled)—e.g., a higher layer parameter denoted by "MTRPoperation," e.g., provided in PDCCH-Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by unifiedTCI-StateType, e.g., provided in PDCCH-Config/ PDSCH-Config/ServingCellConfig is configured and set to "joint" (or "separate") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlResourceSet two values of CORESETGroupIndex (0 and 1) or the UE is not provided in PDSCH-Config/ PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORE- SETGroupIndex, a one-bit flag, a PCI, a PCI index and etc., the UE could use the one-bit (flag) indicator in the beam indication DCI (e.g., in form of a new DCI indicator field or via repurposing the existing DCI field bit(s) in the corresponding DCI format) to determine the association between the (existing) TCI field and a (first and/or second) set of MAC CE activated TCI codepoints; otherwise, i.e., when/if the beam indication DCI, e.g., DCI format 1_1 or 1_2, is without (or with) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is larger/ greater (or smaller/lower) than a threshold or the UE is configured by the network (e.g., via higher layer RRC signaling and/or MAC CE command and/or dynamic DCI based signaling) that the MTRP operation is enabled (or not enabled/disabled)—e.g., a higher layer parameter denoted by "MTRPoperation," e.g., provided in PDCCH-Config/ PDSCH-Config/ServingCellConfig and etc. is configured (or not configured) or set to "enabled"/"on" (or "disabled"/ "off") or the UE is configured by the network (e.g., via higher layer RRC signaling and/or MAC CE command and/or dynamic DCI based signaling) that the unified TCI state type for this serving cell is "separate" (or "joint")— e.g., a higher layer parameter denoted by unifiedTCI-State- Type, e.g., provided in PDCCH-Config/PDSCH-Config/ ServingCellConfig is configured and set to "separate" (or "joint") or the UE is provided in PDSCH-Config/PDCCH- Config/ControlResourceSet two values of CORESET- PoolIndex (0 and 1) or the UE is not provided in PDSCH- Config/PDCCH-Config/ControlResourceSet two values of CORESETPoolIndex (0 and 1) or the UE is provided in PDSCH-Config/PDCCH-Config/ControlResourceSet a single value of CORESETPoolIndex (e.g., 0) or the UE is provided in PDSCH-Config/PDCCH-Config/ControlRe- sourceSet two values of CORESETGroupIndex (0 and 1) or the UE is not provided in PDSCH-Config/PDCCH-Config/ ControlResourceSet two values of CORESETGroupIndex (0 and 1) or the UE is provided in PDSCH-Config/PDCCH- Config/ControlResourceSet a single value of CORESET- GroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESET- GroupIndex, a one-bit flag, a PCI, a PCI index and etc., the UE could use the one-bit (flag) indicator in the beam indication DCI (e.g., in form of a new DCI indicator field or via repurposing the existing DCI field bit(s) in the corre- sponding DCI format) to determine the association between the (existing) TCI field and a TRP (e.g., the one-bit indicator could correspond to an entity ID, where the entity ID could be a value of CORESETPoolIndex, a value of CORESET- GroupIndex, a RS set ID/index, a PCI, a PCI index and etc.

As specified herein in the present disclosure, the second TCI field in the beam indication DCI (e.g., in form of a new DCI indicator field or via repurposing the existing DCI field bit(s) in the corresponding DCI format) can be used to indicate a (first and/or second) set of MAC CE activated TCI codepoints for both TRPs, or to indicate a (first and/or second) set of MAC CE activated TCI codepoints for a single TRP. For this case, the UE could be configured/ provided/informed/indicated by the network, e.g., via higher layer RRC signaling/parameter (e.g., by configuring/turning on a higher layer parameter denoted by "TCIFieldBoth- TRPs" in PDCCH-Config/PDSCH-Config/ControlRe- sourceSet/ServingCellConfig and etc. or by setting the higher layer parameter "TCIFieldBothTRPs" to "enabled"/ "on") and/or MAC CE command and/or dynamic DCI based L1 signaling, to use the second TCI field in the beam indication DCI (e.g., in form of a new DCI indicator field or via repurposing the existing DCI field bit(s) in the corre- sponding DCI format) to determine one or more TCI code- points (and therefore, one or more TCI states indicated therein) from a (first and/or second) set of MAC CE acti- vated TCI codepoints for both TRPs.

Alternatively, the UE could be configured/provided/in- formed/indicated by the network, e.g., via higher layer RRC signaling/parameter (e.g., by configuring/turning on a higher layer parameter denoted by "TCIFieldSingleTRP" in PDCCH-Config/PDSCH-Config/ControlResourceSet/Serv- ingCellConfig and etc. or by setting the higher layer param- eter "TCIFieldSingleTRP" to "enabled"/"on") and/or MAC CE command and/or dynamic DCI based L1 signaling, to use the second TCI field in the beam indication DCI (e.g., in form of a new DCI indicator field or via repurposing the existing DCI field bit(s) in the corresponding DCI format) to determine one or more TCI codepoints (and therefore, one or more TCI states indicated therein) from a (first and/or second) set of MAC CE activated TCI codepoints for the corresponding TRP.

Optionally, when/if the beam indication DCI, e.g., DCI format 1_1 or 1_2, is with (or without) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is smaller/lower (or larger/greater) than a thresh- old or the UE is configured by the network (e.g., via higher layer RRC signaling and/or MAC CE command and/or dynamic DCI based signaling) that the MTRP operation is not enabled (or enabled)—e.g., a higher layer parameter denoted by "MTRPoperation," e.g., provided in PDCCH- Config/PDSCH-Config/ServingCellConfig and etc. is not configured (or configured) or set to "disabled"/"off" (or "enabled"/"on") or the UE is configured by the network (e.g., via higher layer RRC signaling and/or MAC CE command and/or dynamic DCI based signaling) that the unified TCI state type for this serving cell is "joint" (or "separate")—e.g., a higher layer parameter denoted by uni- fiedTCI-StateType, e.g., provided in PDCCH-Config/ PDSCH-Config/ServingCellConfig is configured and set to "joint" (or "separate") or the UE is provided in PDSCH- Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlRe- sourceSet a single value of CORESETPoolIndex (e.g., 0) or the UE is provided in PDSCH-Config/PDCCH-Config/Con- trolResourceSet two values of CORESETGroupIndex (0 and 1) or the UE is not provided in PDSCH-Config/ PDCCH-Config/ControlResourceSet two values of CORE- SETGroupIndex (0 and 1) or the UE is provided in PDSCH- Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc., the UE could use the second TCI field in the beam indication DCI (e.g., in form of a new DCI indicator field or via repurposing the existing DCI field bit(s) in the corresponding DCI format) to determine one or more TCI codepoints (and therefore, one or more TCI states indicated therein) from a (first and/or second) set of MAC CE activated TCI codepoints for both TRPs; otherwise, i.e., when/if the beam indication DCI, e.g., DCI format 1_1 or 1_2, is without (or with) DL assignment or the number of TCI state codepoints Nc1 in the first set of TCI state codepoints (to be) activated by the MAC CE or the number of TCI state codepoints Nc2 in the second set of TCI state codepoints (to be) activated by the MAC CE or the total number of TCI state codepoints Nc1+Nc2 in the first and second sets of TCI state codepoints (to be) activated by the MAC CE is larger/greater (or smaller/lower) than a threshold or the UE is configured by the network (e.g., via higher layer RRC signaling and/or MAC CE command and/or dynamic DCI based signaling) that the MTRP operation is enabled (or not enabled/disabled)—e.g., a higher layer parameter denoted by "MTRP-operation," e.g., provided in PDCCH-Config/PDSCH-Config/ServingCellConfig and etc. is configured (or not configured) or set to "enabled"/"on" (or "disabled"/"off") or the UE is configured by the network (e.g., via higher layer RRC signaling and/or MAC CE command and/or dynamic DCI based signaling) that the unified TCI state type for this serving cell is "separate" (or "joint")—e.g., a higher layer parameter denoted by unifiedTCI-StateType, e.g., provided in PDCCH-Config/PDSCH-Config/ServingCellConfig is configured and set to "separate" (or "joint") or the UE is provided in PDSCH-Config/PDCCH-Config/ControlResourceSet two values of CORESETPoolIndex (0 and 1) or the UE is not provided in PDSCH-Config/PDCCH-Config/ControlResourceSet two values of CORESETPoolIndex (0 and 1) or the UE is provided in PDSCH-Config/PDCCH-Config/ControlResourceSet a single value of CORESET-PoolIndex (e.g., 0) or the UE is provided in PDSCH-Config/PDCCH-Config/ControlResourceSet two values of CORESETGroupIndex (0 and 1) or the UE is not provided in PDSCH-Config/PDCCH-Config/ControlResourceSet two values of CORESETGroupIndex (0 and 1) or the UE is provided in PDSCH-Config/PDCCH-Config/ControlResourceSet a single value of CORESETGroupIndex (e.g., 0) or the UE receives from the network a unified TCI state activation MAC CE with an entity ID provided/configured therein or the UE receives from the network a unified TCI state activation MAC CE with no entity ID(s) provided/configured therein, where the entity ID could correspond to CORESETPoolIndex, CORESETGroupIndex, a one-bit flag, a PCI, a PCI index and etc., the UE could use the second TCI field in the beam indication DCI (e.g., in form of a new DCI indicator field or via repurposing the existing DCI field bit(s) in the corresponding DCI format) to determine one or more TCI codepoints (and therefore, one or more TCI states indicated therein) from a (first and/or second) set of MAC CE activated TCI codepoints for the corresponding TRP.

As specified in the present disclosure, in a (single-DCI based) multi-TRP system, a UE could be indicated/provided/configured by the network, e.g., via a beam indication MAC CE or a DCI (e.g., via one or more TCI codepoints of one or more TCI fields in the corresponding DCI 1_1/1_2 with or without DL assignment), a set of one or more (e.g., N>1)

TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState, under the unified TCI framework.

For PDCCH reception or PDCCH candidate monitoring in a (single-DCI based) multi-TRP system, a UE could be configured/provided/indicated by the network via higher layer RRC signaling/parameter and/or MAC CE command and/or dynamic DCI based L1 signaling—e.g., in higher layer RRC signaling/parameter ControlResourceSet that configures a CORESET—a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET.

For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH (s)/PDCCH candidate(s) in the corresponding CORESET, "01" indicating that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate (s) in the corresponding CORESET, "10" indicating that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s), and "11" indicating that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload.

Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLor-JointTCI-State, a separate UL TCI state provided by TCI-State/UL-TCIState, or a pair of separate DL and separate UL TCI states.

For PDSCH reception in a (single-DCI based) multi-TRP system, a UE could be configured/provided/indicated by the network via higher layer RRC signaling/parameter and/or MAC CE command and/or dynamic DCI based L1 signaling—e.g., in a DL DCI (e.g., DCI format 1_0/1_1/1_2) that schedules the PDSCH—a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with "00" indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH, "01" indicating that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH, "10" indicating that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, and "11" indicating that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency.

Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLor-JointTCI-State, a separate UL TCI state provided by TCI-State/UL-TCIState, or a pair of separate DL and separate UL TCI states. Furthermore, one or more bits of the second indicator or one or more codepoints corresponding to the second indicator in the corresponding DCI format (e.g., '00', '01', '10' and/or '11' as specified herein in the present disclosure) could be reserved.

For PUCCH transmission in a (single-DCI based) multi-TRP system, a UE could be configured/provided/indicated by the network via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s).

For instance, for N=2 (i.e., a set of two TCI states/pairs of TCI states are indicated), the third indicator could be a two-bit indicator with "00" indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/ PUCCH resource(s), "01" indicating that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/ PUCCH resource(s), "10" indicating that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource, and "11" indicating that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency.

Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLor-JointTCI-State, a separate UL TCI state provided by TCI-State/UL-TCIState, or a pair of separate DL and separate UL TCI states.

For PUSCH transmission in a (single-DCI based) multi-TRP system, a UE could be configured/provided/indicated by the network via higher layer RRC signaling/parameter and/or MAC CE command and/or dynamic DCI based L1 signaling—e.g., in an UL DCI (e.g., DCI format 0_0/0_1/0_2) that schedules the PUSCH—a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s).

For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH, "01" indicating that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH, "10" indicating that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs— e.g., scheduled by the UL DCI/PDCCH, and "11" indicating that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/ PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure— could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

The UE could be configured/indicated/provided by the network, e.g., via higher layer RRC signaling/parameter and/or MAC CE command and/or dynamic DCI based L1 signaling, whether or not the first indicator, the second indicator, the third indicator and/or the fourth indicator as specified herein in the present disclosure could be present (or absent) in their respective RRC signaling(s)/parameter(s) and/or DCI format(s). For instance, whether or not the second indicator for indicating which one or more of the set of TCI states/pairs of TCI states indicated, e.g., by a TCI codepoint, in a beam indication DCI or MAC CE as specified herein in the present disclosure, to use/apply for receiving the PDSCH(s) is present (or absent) in the corresponding scheduling DCI (e.g., DCI format 1_1/1_2) could be configured by a RRC signaling/parameter; when/if the UE is provided by the network the RRC signaling/parameter, e.g., denoted by dynamicSwitch-r18, and/or the RRC signaling/parameter (e.g., dynamicSwitch-r18) is set to "enabled" or "on," the second indicator as specified herein in the present disclosure could be present in the corresponding scheduling DCI; otherwise, when/if the UE is not provided by the network the RRC signaling/parameter (e.g., dynamicSwitch-r18), or the RRC signaling/parameter, e.g., denoted by dynamicSwitch-r18, is set to "disabled" or "off," the second indicator as specified herein in the present disclosure could be absent in the corresponding scheduling DCI.

When/if the second indicator is (RRC configured to be) present in the corresponding scheduling DCI (e.g., DCI format 1_1/1_2), the maximum number of TCI codepoints that can be activated by the MAC CE command (e.g., (enhanced) unified TCI states activation/indication MAC CE) as specified herein in the present disclosure could be $M1 \geq 1$. In the present disclosure, $M1 = 2^{m1}$, where $m1 \in \{0, 1, 2, 3, 4, 5, 6, \ldots\}$. For example, $M1 = 8$ with $m1 = 3$.

When/if the second indicator is absent in the corresponding scheduling DCI (e.g., DCI format 1_1/1_2), and/or one or more MTRP schemes for PDSCH reception(s) are configured/enabled, the maximum number of TCI codepoints that can be activated by the MAC CE command (e.g., (enhanced) unified TCI states activation/indication MAC CE) as specified herein in the present disclosure could be $M2 \geq 1$. In the present disclosure, $M2 = 2^{m2}$, where $m2 \in \{0, 1, 2, 3, 4, 5, 6, \ldots\}$. For example, $M2 = 16$ with $m2 = 4$.

FIG. 13 illustrates an example of determination for a maximum number of MAC CE activated TCI codepoints 1300 according to embodiments of the present disclosure. The determination for the maximum number of MAC CE activated TCI codepoints 1300 as may be performed by a UE (e.g., 111-116 as illustrated in FIG. 1). An embodiment of the determination for the maximum number of MAC CE activated TCI codepoints 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

A conceptual example characterizing the above described design procedure(s) is presented in FIG. 13. As illustrated in FIG. 13, when the RRC parameter/signaling, e.g., dynamicSwitch-r18, configures the second indicator to be present in the corresponding scheduling DCI, the maximum number of MAC CE activated TCI codepoints is $M1 = 8$, and when the second indicator is absent in the corresponding scheduling DCI—e.g., the higher layer RRC parameter/signaling dynamicSwitch-r18 is not provided or is set to "disabled" or "off," the maximum number of MAC CE activated TCI codepoints is $M2 = 16$.

In the present disclosure, (1) $M1 = M2$, (2) $M1 > M2$ or (3) $M1 < M2$. For a given maximum number of TCI codepoints that can be activated by the MAC CE command (i.e., M1 or M2 in the present disclosure), how to associate the (existing) TCI field in the beam indication DCI and one or more of the MAC CE activated TCI codepoints could be determined according to one or more of the design examples specified herein in the present disclosure. Furthermore, whether the maximum number of TCI codepoints that can be activated by the MAC CE command (e.g., (enhanced) unified TCI states activation/indication MAC CE) as specified herein in the present disclosure could correspond to M1 or M2 could be determined according to whether or not the first indicator, the third indicator and/or the fourth indicator as specified herein in the present disclosure could be present (or absent) in their respective RRC signaling(s)/parameter(s) and/or DCI format(s)—similar to the design examples specified herein (above) in the present disclosure for determining the maximum number of TCI codepoints that can be activated by the MAC CE command (e.g., (enhanced) unified TCI states activation/indication MAC CE) as specified herein in the present disclosure (i.e., M1 or M2 in the present disclosure) according to whether or not the second indicator as specified herein in the present disclosure could be present (or absent) in the corresponding scheduling DCI (e.g., DCI format 1_1/1_2).

As specified herein in the present disclosure, one or more codepoints corresponding to the second indicator in the corresponding DCI format (e.g., '00', '01', '10' and/or '11' as specified herein in the present disclosure)—e.g., that are reserved—could be used/repurposed as the DCI indicator(s) specified herein in the present disclosure. For instance, the codepoint '11' of the second indicator could be used/repurposed to indicate to the UE, from which of the first set or the second set of MAC CE activated TCI codepoints as specified herein in the present disclosure, the TCI state(s) indicated by one or more TCI codepoints of one or more TCI fields in a beam indication DCI is selected/determined. For example, when the second indicator is set to '11', the TCI state(s) indicated by one or more TCI codepoints of one or more TCI fields in a beam indication DCI could be determined/selected from the first (or second) set of MAC CE activated TCI codepoints as specified herein in the present disclosure; otherwise—i.e., when the second indicator is not set to '11', the TCI state(s) indicated by one or more TCI codepoints of one or more TCI fields in a beam indication DCI could be determined/selected from the second (or first) set of MAC CE activated TCI codepoints as specified herein in the present disclosure.

Throughout the present disclosure, the first set of MAC CE activated TCI codepoints or the first set of activated TCI codepoints in a MAC CE could also correspond to or be equivalent to the TCI codepoints activated by the first MAC CE as specified herein in the present disclosure, and the second set of MAC CE activated TCI codepoints or the second set of activated TCI codepoints in the MAC CE could also correspond to or be equivalent to the TCI codepoints activated by the second MAC CE as specified herein in the present disclosure.

As specified herein in the present disclosure, a UE could be configured/provided/indicated by the network, e.g., via higher layer RRC signaling and/or MAC CE command and/or dynamic DCI based L1 signaling, M>1 or N>1 (e.g., M=2 or N=2) groups of SSBs or SSB indexes with each group providing/indicating (root) QCL source RS(s) for/as the RS(s) in a different indicated TCI state(s) of a TCI codepoint as specified herein in the present disclosure. When/if the UE is configured/provided/indicated by the network, e.g., via higher layer RRC signaling and/or MAC CE command and/or dynamic DCI based L1 signaling, M>1 or N>1 (e.g., M=2 or N=2) groups of SSBs or SSB indexes as specified herein in the present disclosure, the first indicator, the second indicator, the third indicator and/or the fourth indicator as specified herein in the present disclosure, could be present (or absent) in the corresponding RRC signaling/parameter and/or DCI format.

For instance, when/if the UE is configured/provided/indicated by the network, e.g., via higher layer RRC signaling and/or MAC CE command and/or dynamic DCI based L1 signaling, M>1 or N>1 (e.g., M=2 or N=2) groups of SSBs or SSB indexes as specified herein in the present disclosure, the second indicator as specified herein in the present disclosure could be present in the corresponding DCI format (e.g., DCI format 1_1/1_2) for PDSCH reception.

As specified herein in the present disclosure, a UE could be configured/provided/indicated by the network, e.g., via higher layer RRC signaling and/or MAC CE command and/or dynamic DCI based L1 signaling, M>1 or N>1 (e.g., M=2 or N=2) groups/lists of TCI states or TCI state IDs with each group/list providing/indicating a different indicated TCI state(s) of a TCI codepoint as specified herein in the present disclosure. When/if the UE is configured/provided/indicated by the network, e.g., via higher layer RRC signaling and/or MAC CE command and/or dynamic DCI based L1 signaling, M>1 or N>1 (e.g., M=2 or N=2) groups/lists of TCI states or TCI state IDs as specified herein in the present disclosure, the first indicator, the second indicator, the third indicator and/or the fourth indicator as specified herein in the present disclosure, could be present (or absent) in the corresponding RRC signaling/parameter and/or DCI format.

For instance, when/if the UE is configured/provided/indicated by the network, e.g., via higher layer RRC signaling and/or MAC CE command and/or dynamic DCI based L1 signaling, M>1 or N>1 (e.g., M=2 or N=2) groups/lists of TCI states or TCI state IDs as specified herein in the present disclosure, the second indicator as specified herein in the present disclosure could be present in the corresponding DCI format (e.g., DCI format 1_1/1_2) for PDSCH reception.

As illustrated in FIG. 13, in step 1302, a UE receives a high layer RRC signaling/parameter to indicate whether or not the second indicator for PDSCH reception(s) is present (or absent) in the corresponding scheduling DCI. In step 1304, the UE determines whether the second indicator is (RRC configured to be) present in the corresponding scheduling DCI. In step 1304, if yes, the UE, in step 1306, identifies that the maximum number of MAC CE activated TCI codepoints is M1=8. In step 1304, if no, the UE, in step 1308, identifies that the maximum number of MAC CE activated TCI codepoints is M2=16.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
    receive, in a first medium access control-control element (MAC CE), up to K sets of transmission configuration indication (TCI) states;
    receive, in a first downlink control information (DCI), a set of TCI states including one or two TCI states;
    receive a higher layer radio resource control (RRC) signaling including a parameter indicating whether or not a TCI state selection indicator is present in a second DCI that schedules a physical downlink shared channel (PDSCH); and
    receive the second DCI; and
a processor operably coupled to the transceiver, the processor configured to:
    determine, based on the parameter, whether the TCI state selection indicator is present in the second DCI;
    identify, based on a presence or absence of the TCI state selection indicator, at least one TCI state from the set of TCI states to be used in reception of the PDSCH;
    determine a value of K as 8, when the parameter indicates that the TCI state selection indicator is present in the second DCI; and
    determine the value of K as 16, when the parameter indicates that the TCI state selection indicator is absent in the second DCI,
wherein the transceiver is further configured to receive, based on the identified at least one TCI state, the PDSCH.

2. The UE of claim 1, wherein the processor is further configured to:
determine, based on the value of K, a maximum number of TCI field bits in the first DCI,
determine that the maximum number of TCI field bits is 3, when the value of K is 8, and
determine that the maximum number of TCI field bits is 4, when the value of K is 16.

3. The UE of claim 1, wherein:
when the value of K is 16, the K sets in the first MAC CE are further partitioned into a first group and a second group with each group including 8 sets of TCI states;
the processor is further configured to determine, based on a rule, the first or the second group; and
the rule is:
    indicated via higher layer RRC signaling, a MAC CE, or a DCI, or
    identified based on a system specification such that the first group contains a first 8 out of the 16 sets in the first MAC CE and the second group contains a last 8 out of the 16 sets in the first MAC CE.

4. The UE of claim 3, wherein, when the first DCI carries a PDSCH assignment, the processor is further configured to identify that the set of TCI states received in the first DCI are from the first group.

5. The UE of claim 3, wherein, when the first DCI does not carry a PDSCH assignment:

the first DCI includes a one-bit indicator with '0' indicating the first group and '1' indicating the second group; and the processor is further configured to identify, based on the one-bit indicator, whether the set of TCI states received in the first DCI are from the first group or the second group.

6. The UE of claim 5, wherein:

when the one-bit indicator is set to '0', the processor is further configured to identify that the set of TCI states received in the first DCI are from the first group, and when the one-bit indicator is set to '1', the processor is further configured to identify that the set of TCI states received in the first DCI are from the second group.

7. The UE of claim 1, wherein:

the transceiver is further configured to receive a second MAC CE, including N sets of TCI states;

when the first DCI does not carry a PDSCH assignment, the first DCI includes a one-bit indicator with '0' indicating the first MAC CE and '1' indicating the second MAC CE;

when the one-bit indicator is set to '0', the processor is further configured to identify that the set of TCI states received in the first DCI are from the K sets in the first MAC CE; and when the one-bit indicator is set to '1', the processor is further configured to identify that the set of TCI states received in the first DCI are from the N sets in the second MAC CE.

8. A base station (BS), comprising:

a transceiver configured to:

transmit, in a first medium access control-control element (MAC CE), up to K sets of transmission configuration indication (TCI) states;

transmit, in a first downlink control information (DCI), a set of TCI states including one or two TCI states;

transmit a higher layer radio resource control (RRC) signaling including a parameter indicating whether or not a TCI state selection indicator is present in a second DCI that schedules a physical downlink shared channel (PDSCH), wherein a presence or absence of the TCI state selection indicator in the second DCI indicates at least one TCI state from the set of TCI states to be used for reception of the PDSCH; and transmit the PDSCH for reception based on the at least one TCI state, wherein a value of K is 8, when the parameter indicates that the TCI state selection indicator is present in the second DCI, and wherein the value of K is 16, when the parameter indicates that the TCI state selection indicator is absent in the second DCI.

9. The BS of claim 8, wherein:

the value of K indicates a maximum number of TCI field bits in the first DCI, the maximum number of TCI field bits is 3, when the value of K is 8, and the maximum number of TCI field bits is 4, when the value of K is 16.

10. The BS of claim 8, wherein:

when the value of K is 16, the K sets in the first MAC CE are further partitioned into a first group and a second group with each group including 8 sets of TCI states;

the first or the second group are grouped based on a rule; and the rule is:

indicated via higher layer RRC signaling, a MAC CE, or a DCI, or indicated based on a system specification such that the first group contains a first 8 out of the 16 sets in the first MAC CE and the second group contains a last 8 out of the 16 sets in the first MAC CE.

11. The BS of claim 10, wherein, when the first DCI carries a PDSCH assignment, the set of TCI states in the first DCI are from the first group.

12. The BS of claim 10, wherein, when the first DCI does not carry a PDSCH assignment:

the first DCI includes a one-bit indicator with '0' indicating the first group and '1' indicating the second group; and the one-bit indicator indicates whether the set of TCI states in the first DCI are from the first group or the second group.

13. The BS of claim 12, wherein:

when the one-bit indicator is set to '0', the set of TCI states in the first DCI are from the first group, and when the one-bit indicator is set to '1', the set of TCI states in the first DCI are from the second group.

14. The BS of claim 12, wherein:

the transceiver is further configured to transmit a second MAC CE, including N sets of TCI states;

when the first DCI does not carry a PDSCH assignment, the first DCI includes a one-bit indicator with '0' indicating the first MAC CE and '1' indicating the second MAC CE;

when the one-bit indicator is set to '0', the set of TCI states in the first DCI are from the K sets in the first MAC CE; and when the one-bit indicator is set to '1', the set of TCI states in the first DCI are from the N sets in the second MAC CE.

15. A method performed by a user equipment (UE), the method comprising:

receiving, in a first medium access control-control element (MAC CE), up to K sets of transmission configuration indication (TCI) states;

receiving, in a first downlink control information (DCI), a set of TCI states including one or two TCI states;

receiving a higher layer radio resource control (RRC) signaling including a parameter indicating whether or not a TCI state selection indicator is present in a second DCI that schedules a physical downlink shared channel (PDSCH);

receiving the second DCI;

determining, based on the parameter, whether the TCI state selection indicator is present in the second DCI;

identifying, based on a presence or absence of the TCI state selection indicator, at least one TCI state from the set of TCI states to be used in reception of the PDSCH;

determining a value of K as 8, when the parameter indicating that the TCI state selection indicator is present in the second DCI;

determining the value of K as 16, when the parameter indicating that the TCI state selection indicator is absent in the second DCI; and receiving, based on the identified at least one TCI state, the PDSCH.

16. The method of claim 15, further comprising:

determining, based on the value of K, a maximum number of TCI field bits in the first DCI;

determining that the maximum number of TCI field bits is 3, when the value of K is 8; and determining that the maximum number of TCI field bits is 4, when the value of K is 16.

17. The method of claim 15, wherein:

when the value of K is 16, the K sets in the first MAC CE are further partitioned into a first group and a second group with each group including 8 sets of TCI states;

the method further comprises determining, based on a rule, the first or the second group; and the rule is:

indicated via higher layer RRC signaling, a MAC CE, or a DCI, or identified based on a system specification such that the first group contains a first 8 out of the 16 sets in the first MAC CE and the second group contains a last 8 out of the 16 sets in the first MAC CE.

\* \* \* \* \*